(12) United States Patent
Bleyl et al.

(10) Patent No.: US 10,945,119 B2
(45) Date of Patent: *Mar. 9, 2021

(54) INTEGRATION SYSTEM FOR COMMUNICATIONS NETWORKS

(71) Applicant: Cox Communications, Inc., Atlanta, GA (US)

(72) Inventors: Donald Carl Bleyl, Johns Creek, GA (US); Erik Fields, Atlanta, GA (US); John Landis, Atlanta, GA (US); Josh Nelson, Atlanta, GA (US); Roy Pereira, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,295

(22) Filed: Nov. 25, 2019

(65) Prior Publication Data

US 2020/0100096 A1 Mar. 26, 2020

Related U.S. Application Data

(63) Continuation of application No. 15/672,282, filed on Aug. 8, 2017, now Pat. No. 10,492,058.

(Continued)

(51) Int. Cl.
*H04W 8/18* (2009.01)
*H04W 8/00* (2009.01)
(Continued)

(52) U.S. Cl.
CPC ............. *H04W 8/18* (2013.01); *H04W 8/005* (2013.01); *H04W 48/08* (2013.01); *H04L 67/22* (2013.01); *H04N 21/44222* (2013.01); *H04N 21/6125* (2013.01); *H04W 8/245* (2013.01); *H04W 60/02* (2013.01); *H04W 74/002* (2013.01)

(58) Field of Classification Search
CPC ....... H04W 8/18; H04W 8/005; H04W 8/245; H04W 48/08; H04W 60/02; H04W 74/002
See application file for complete search history.

(56) References Cited

U.S. PATENT DOCUMENTS

| | | | | |
|---|---|---|---|---|
| 2002/0052754 A1* | 5/2002 | Joyce | ................ | H04W 12/1206 455/407 |
| 2010/0217837 A1* | 8/2010 | Ansari | .................... | H04L 67/16 709/218 |

(Continued)

*Primary Examiner* — Margaret G Mastrodonato
(74) *Attorney, Agent, or Firm* — Eversheds Sutherland (US) LLP

(57) ABSTRACT

Embodiments of the disclosure provide methods, systems, apparatuses, and computer program products for facilitating communications between a plurality of devices and subsystems on a first network (for example, a first cable network) and one or more devices and subsystems on a second network (for example, a second cable network) using an integration system on the first network. In one embodiment, the integration system may allow for deployment of new systems or infrastructures that can cooperatively operate with legacy systems already deployed on the first or second networks. Particular embodiments of the subject matter may reduce the cost associated with deploying, upgrading and/or maintaining the devices and systems on the first and/or second networks.

20 Claims, 15 Drawing Sheets

Related U.S. Application Data

(60) Provisional application No. 62/372,146, filed on Aug. 8, 2016.

(51) Int. Cl.
  *H04W 48/08* (2009.01)
  *H04W 8/24* (2009.01)
  *H04W 60/02* (2009.01)
  *H04W 74/00* (2009.01)
  *H04N 21/442* (2011.01)
  *H04L 29/08* (2006.01)
  *H04N 21/61* (2011.01)

(56) References Cited

U.S. PATENT DOCUMENTS

| | | | |
|---|---|---|---|
| 2011/0138064 A1* | 6/2011 | Rieger | H04N 21/433 709/228 |
| 2012/0089699 A1* | 4/2012 | Cholas | G06F 21/10 709/217 |
| 2013/0073392 A1* | 3/2013 | Allen | G06Q 30/0633 705/14.58 |
| 2015/0019701 A1* | 1/2015 | Marvin | G06F 9/542 709/223 |

\* cited by examiner

INTEGRATION SYSTEM FOR COMMUNICATIONS NETWORKS

PRIORITY INFORMATION

This application claims the benefit of U.S. patent application Ser. No. 15/672,282, filed on Aug. 8, 2017, which claims the benefit of U.S. Provisional Patent Application No. 62/372,146, filed on Aug. 8, 2016, the disclosure of which is incorporated herein by reference in its entirety.

TECHNICAL FIELD

This disclosure generally relates to communication systems.

BACKGROUND

Service providers, such as cable providers, cellular providers, and/or satellite providers, may provide media using media broadcasts, on demand video, calls, email, and the like to a plurality of different devices (for example, television, mobile phone, tablets, set-top boxes and the like). Such service providers may also connect user devices to communications networks such as the Internet and/or cable networks. Deploying infrastructure for the services described above, in many cases, may be costly, and integrating legacy devices with new infrastructure technologies can be challenging.

BRIEF DESCRIPTION OF THE DRAWINGS

Reference will now be made to the accompanying drawings, which are not necessarily drawn to scale, and wherein.

DETAILED DESCRIPTION

Figure 1:
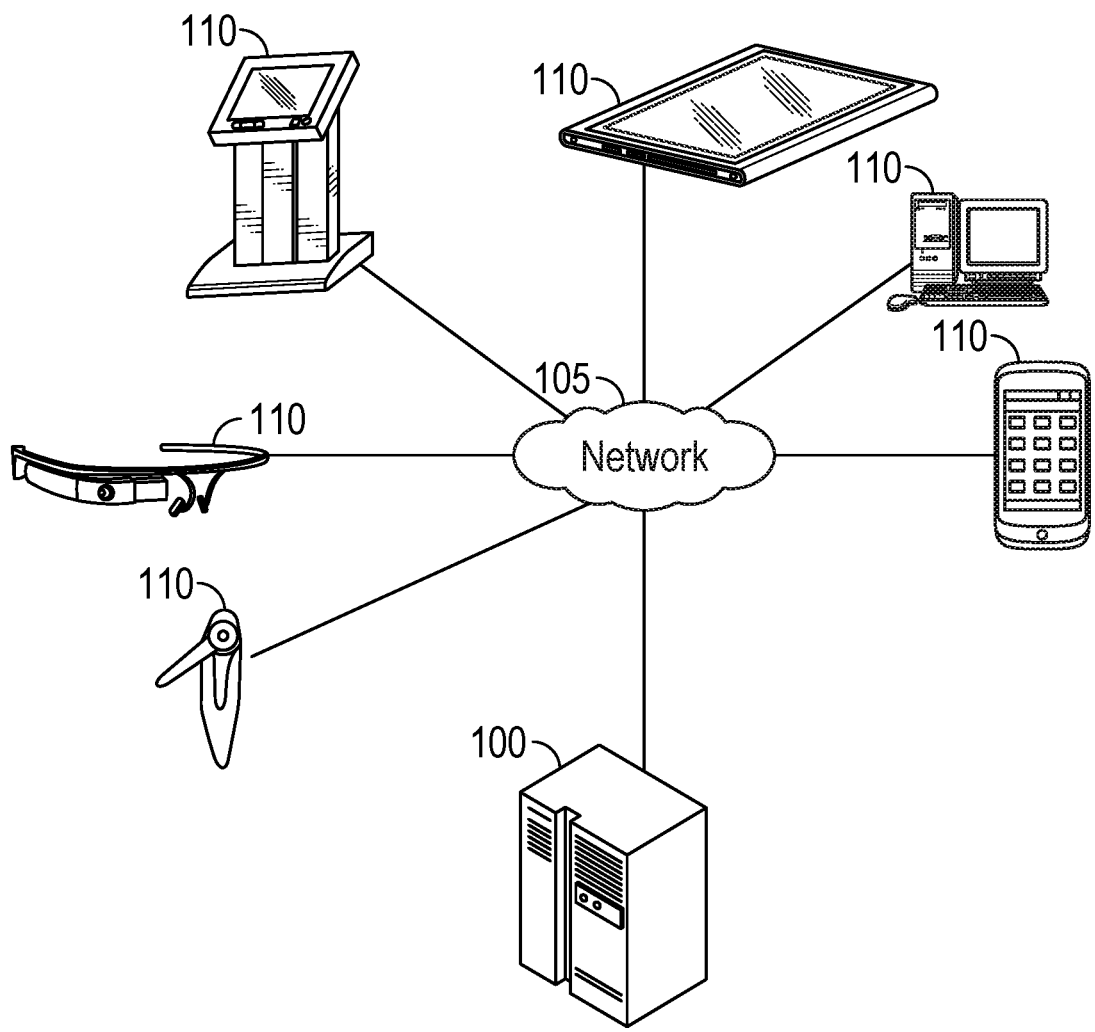
FIG. 1 shows an overview of a system that can be used in connection with various embodiments of the disclosure, in accordance with one or more example embodiments of the disclosure.

In one embodiment, this disclosure relates, in part, to systems and methods for an integration system for facilitating data (for example, video data, audio data, email data, and/or the like) provisioning and management over networks, for example, one or more cable networks. In various embodiments, the disclosure relates generally to the integration of different cable networks. For example, the disclosure describes the integration, using an integration system, of an MSO (Multi-System Operator) cable network (referred interchangeably herein as home network, and/or home cable network, and the like) and associated systems, with a third-party network (referred interchangeably herein as partner network, third-party back office, third-party back office network, and/or third-party computers, and the like). In one embodiment, the integration of the home cable network can include the inclusion of a third-party network's self-contained media client platform (for example, in the form of an application) on one or more devices (for example, one or more set-top boxes) associated with the home network. In another embodiment, the disclosure describes, in various embodiments, the integration of an MSO's media systems (such as video on demand (VOD) back-office computers, switched digital servers (SDSs), cable headend controllers, emergency alert systems, monitoring systems, billing systems, account provisioning systems, associated network infrastructures and/or the like), with third-party network systems and computers, for example, through on-site or cloud-hosted middleware integration systems and/or servers using the integration system.

In various embodiments, described herein include data processing systems and methods for integrating existing home network systems, for example, existing MSO back office systems with one or more systems of the third-party network, in order to enable a standalone, self-contained third-party media client provider to deliver media services on the home network on behalf of a cable operator on the home network. In some embodiments, the systems and methods for integrating existing home network systems, for example, existing MSO back office systems, may be capable of delivering cable-operator specific information regarding the systems, devices, accounts and content to one or more users, for example, to offer existing and/or new subscribers video service on the third-party video client software running on the home network's devices.

In an embodiment, the systems and methods described herein can enable the gathering of data from the home network's existing systems (for example, data specifying home network device capabilities, account provisioning information, linear media and video on demand (VOD) content availability and entitlement information and/or requirements, channel information, for example, in the form of meta-data, switched digital video configuration details, pay-per-view (PPV) scheduling and pricing data) in order to enable the third-party video client software to facilitate integration between the home network and the third-party network.

In addition, the systems and methods may facilitate provisioning accounts and/or devices from the home network's existing provisioning systems to the third-party video client provider's back-office systems, for example, in order to enable service for subscribers on the home network. For example, the systems and methods may allow existing or new customers to receive media services (such as cable transmissions) on the third-party client software. In one embodiment, operations to provide such capabilities may include the integration system providing functionality to integrate with the home network's existing provisioning system, providing operations to indicate, via a flag identifying a customer as receiving the service, and to transmit account, device and entitlement information to a third-party network's back office systems, for example, at one or more back office system computers. In some embodiments the disclosed systems and methods may provide bidirectional, secure (for example, encrypted) communication between existing diagnostics and monitoring systems on the home network in association with the third-party network. One or more embodiments of the disclosure may describe an integration system that provides a home cable network's subscribers with the ability to receive media subscription services from a standalone, self-contained third-party media client system on behalf of the home network, for example, using a third-party application running on a home network device (such as a set-top box).

In one embodiment, the subject matter described herein can be implemented so as to provide accurate and efficient methods and systems for integrating various legacy systems or infrastructure with new systems or infrastructures. In turn, the integration system may, in various embodiments, allow for deployment of new systems or infrastructures that can cooperatively operate with legacy systems already deployed in a given network (for example, a home network and/or a third-party network). Particular embodiments of the subject matter may reduce the cost associated with deploying, upgrading and/or maintaining data provisioning systems and other functions associated with the integration system and/or any related subsystems (for example, a billings system) and, in turn, can increase the overall revenue of a cable network. In one embodiment, the disclosed systems and methods can serve to reduce the processing power for servers. Similarly, the disclosed systems and methods can serve to reduce the processing power of one of more systems (such as servers) on a network (such as a cable network), and thereby increase the overall revenue generated from the network.

The details of one or more embodiments of the subject matter described herein are set forth in the accompanying drawings and the description below. Other features, aspects, and advantages of the subject matter will become apparent from the description, the drawings, and the claims. Various embodiments of the present disclosure now will be described hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. In one embodiment, arrows in each of the figures depict bi-directional data flow and/or bi-directional data flow capabilities.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example, a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example, Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As may be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that includes combinations of computer program products and hardware performing certain steps or operations.

Embodiments of the present disclosure may be described below with reference to block diagrams and flowchart illustrations. Thus, it may be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example, the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 provides an illustration of an example embodiment of the present disclosure. As shown in FIG. 1, this particular embodiment may include the integration system 100, one or more networks 105, and one or more user devices 110. These components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Figure 2:
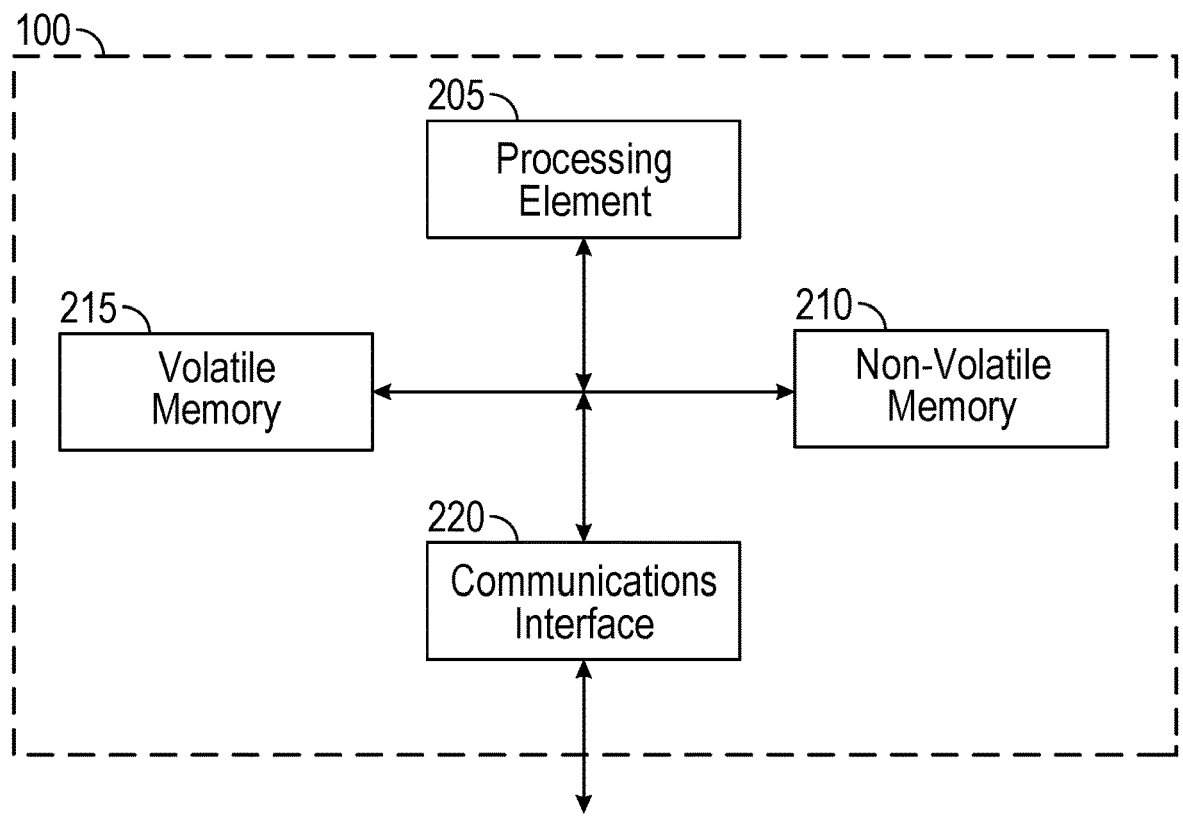
FIG. 2 shows an example schematic diagram of an integration system, in accordance with one or more example embodiments of the disclosure.

FIG. 2 provides a schematic of an integration system 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example, Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the integration system 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the integration system 100 may communicate with user devices 110 and/or a variety of other computing entities.

As shown in FIG. 2, in one embodiment, the integration system 100 may include or be in communication with one or more processing elements 205 (also referred to as processors, processing circuitry, and/or similar terms used herein interchangeably) that communicate with other elements within the integration system 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the integration system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the integration system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the integration system 100 with the assistance of the processing element 205 and operating system.

As indicated, in one embodiment, the integration system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the integration system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the integration system 100 may include or be in communication with one or more input elements, such as a keyboard input, a mouse input, a touch screen/display input, motion input, movement input, audio input, pointing device input, joystick input, keypad input, and/or the like. The integration system 100 may also include or be in communication with one or more output elements (not shown), such as audio output, video output, screen/display output, motion output, movement output, and/or the like.

As will be appreciated, one or more of the integration system's 100 components may be located remotely from other integration system 100 components, such as in a distributed system. Furthermore, one or more of the components may be combined and additional components performing functions described herein may be included in the integration system 100. Thus, the integration system 100 can be adapted to accommodate a variety of needs and circumstances. As will be recognized, these architectures and descriptions are provided for example purposes only and are not limiting to the various embodiments.

Figure 3:
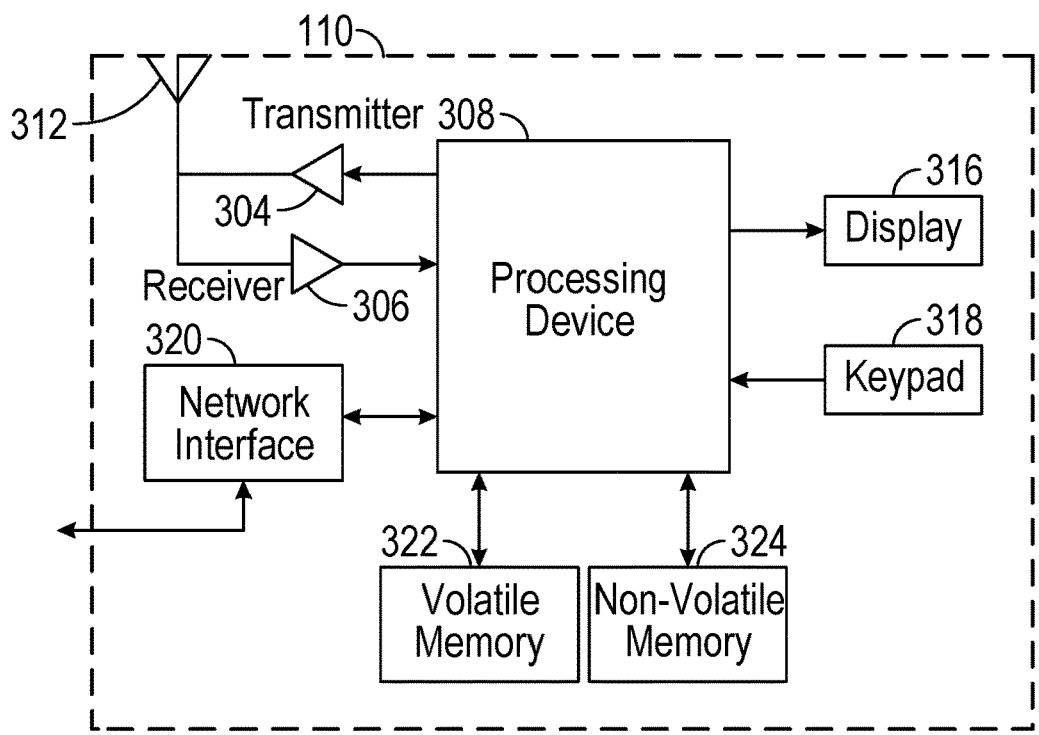
FIG. 3 shows an example schematic diagram of a user device, in accordance with one or more example embodiments of the disclosure.

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the integration system 100. FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more set-top boxes, computers, computing entities, desktops, mobile phones, tablets, phablets, notebooks, laptops, distributed systems, gaming consoles (for example, Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example, radio), a receiver 306 (for example, radio), and a processing element 308 (for example, CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the integration system 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the integration system 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example, including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example, smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the integration system 100, as described herein. The user input interface can comprise any of a number of devices or interfaces allowing the user device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the integration system 100 and/or various other computing entities.

In another embodiment, the user device 110 may include one or more components or functionality that are the same or similar to those of the integration system 100, as described in greater detail above. As will be recognized, these architectures and descriptions are provided for example purposes only and are not limiting to the various embodiments.

In various embodiments, the disclosure relates generally to the integration of cable network, for example, a home network comprising a MSO (Multi-System Operator) cable network (referred interchangeably herein as home network, and/or home cable network), and associated systems, with a third-party network (referred interchangeably herein as partner network). In one embodiment, the integration of the cable network can include the inclusion of a third-party network's self-contained video client solution on one or more devices associated with the home network. In another embodiment, the disclosure describes, in various embodiments, the integration of an MSO's media systems (such as video on demand back-offices, switched digital servers, cable headend controllers, emergency alert systems, monitoring systems, billing systems account provisioning systems, associated network infrastructures, and/or the like), with the third-party network, through on-site or cloud-hosted middleware integration systems and/or servers.

In various embodiments, described herein are data processing systems and methods for integrating existing home network systems, for example, existing MSO back office systems with one or more systems of the third-party network, in order to enable a standalone, self-contained third-party media client provider to deliver media services on the home network on behalf of a cable operator. In some embodiments, the system and method for integrating existing home network systems, for example, existing MSO back office systems, may be capable of delivering cable-operator specific information regarding the systems, devices, accounts and content necessary for offering existing and/or new subscribers video service on the third-party video client software.

In an embodiment, the systems and methods described herein can enable gathering data from the home network's existing systems (for example, data specifying device capabilities, account provisioning information, linear media and video on demand (VOD) content availability and entitlement information and/or requirements, channel information, for example, in the form of meta-data, switched digital video configuration details, pay-per-view (PPV) scheduling and pricing data) in order to enable the third-party video client software to facilitate integration between the home network and the third-party network.

In addition, the systems and methods may facilitate provisioning accounts and/or devices from the home network's existing provisioning systems to the third-party video client provider's back-office systems, for example, in order to enable service for subscribers on the home network. For example, the systems and methods may allow existing or new customers to receive media services on the third-party client software. In one embodiment, operations to provide such capabilities may include integrating with the home network's existing provisioning system, providing operations to indicate, via a flag identifying a customer as receiving the service, and transmitting account, device and entitlement information to a third-party network's back office systems, for example, at one or more back office system computers. In some embodiments the disclosed systems and methods may provide bidirectional, secure (for example, encrypted) communication between existing diagnostics and monitoring systems. Embodiments of the disclosure may provide an integration platform that provides a cable operator's subscribers with the ability to receive media subscription services from a standalone, self-contained third-party video client system on behalf of the home network.

Figure 4:
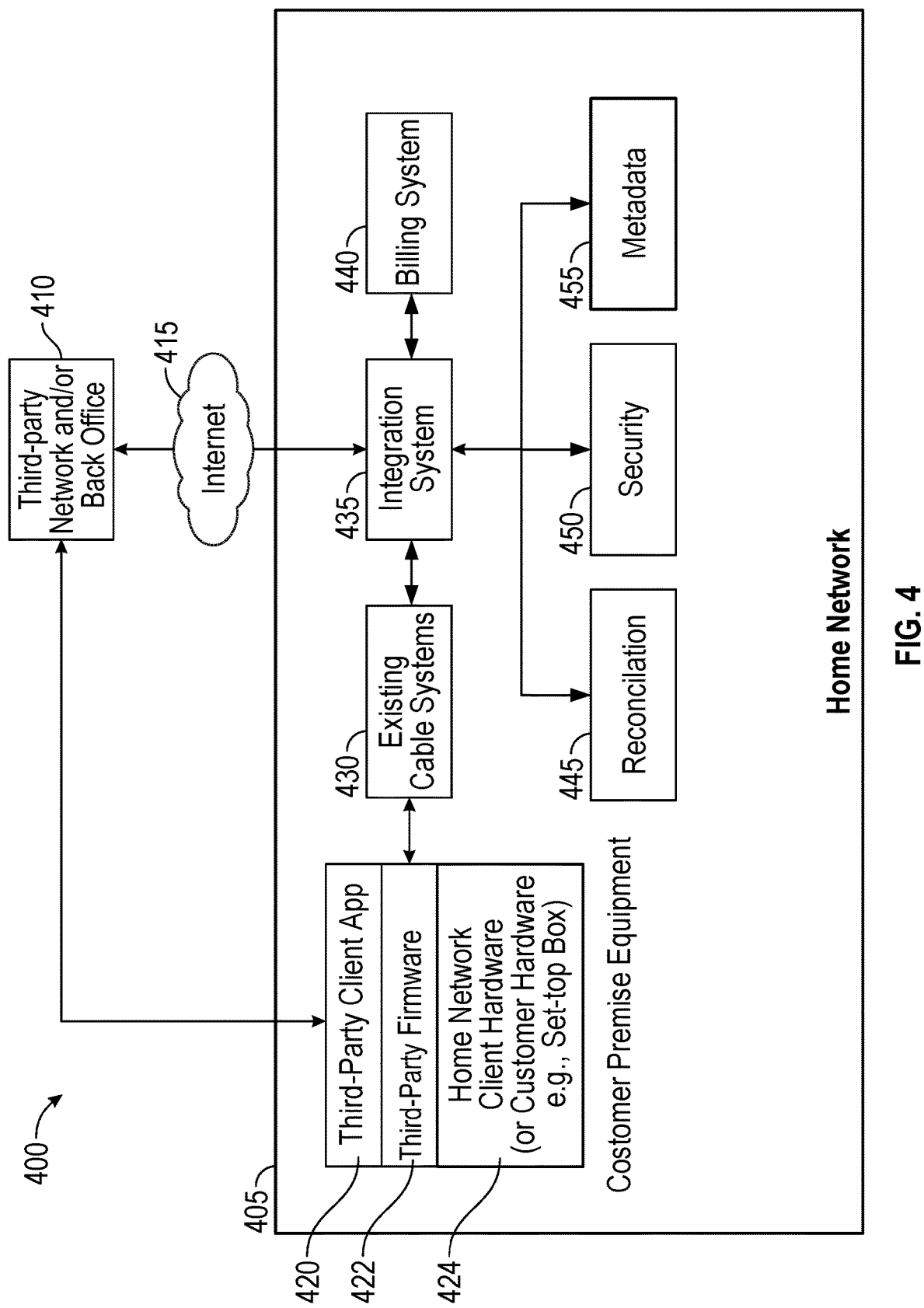
FIG. 4 shows a diagram representing a system architecture, showing an integration system on a home network communicating with a third-party back office over the Internet, in accordance with one or more example embodiments of the disclosure.

FIG. 4 depicts an environment 400 at which one or more devices operate in accordance with one or more example embodiments of the disclosure. In particular, FIG. 4 shows a diagram 400 representing a system architecture showing an integration system on a home network communicating with a third-party back office over the Internet. In an embodiment, a home network 405 can include an integration system 435. In another embodiment, the integration system 435 can communicate to a third-party back office 410, for example, through the Internet 415. In one embodiment, the home network 405 can further include a customer premise equipment including a third-party client application 420, a third-party firmware 422, and a client hardware, for example, a customer hardware such as a set-top box, a tablet computer, and/or a laptop, and the like. In one embodiment, the integration system 435 and user devices such as customer premise equipment may be direct communication, for example, via cable. In one embodiment, the integration system 435 may facilitate the transmission of data between various systems, such as the existing cable system 430, billing systems 440, and/or third-party back office 410 computers and systems.

In one embodiment, the customer premise equipment can communicate to a third-party back office 410 through the Internet 415. In another embodiment, the integration system 435 of the home network 405 can include at least a reconciliation module 445. In another embodiment, the reconciliation module can serve to provide error handling functionality. In one embodiment, the integration system 435 can also include a security functionality module 450. In one embodiment, the integration system 435 can include a metadata functionality module 455. In another embodiment, the metadata functionality module 455 can include functionality associated with one or more channel source IDs, video on demand (VOD) asset IDs, pricing information, and the like. In one embodiment, the integration system 435 can communicate with existing cable systems 430, which can in turn communicate with the customer premise equipment. For example, the existing cable systems 430 can communicate with the customer premise equipment using the third-party firmware 422.

In another embodiment, the integration system 435 can communicate with a billing system 440. In an embodiment, the billing system 440 can include one or more legacy billing systems. In one embodiment, the integration system 435 may receive information from a given billing system 440 but may not be able to necessarily push information back to the billing system 440.

In one embodiment, the integration system can provide the functionality represented by the reconciliation functionality module 445. The security functionality module 450, and/or the metadata functionality module 455, in order to integrate the client hardware 424 with a third-party back office services 410, for example, using a third-party client app 420 that runs on the customer premise equipment using third-party firmware 422. In one embodiment, the third-party back office 410 can provide content including, for example, but not limited to, VOD content, linear data, video, audio, and the like to the customer premise equipment on the home network 405, using the third-party client application 420 in association with the third-party firmware 422. In another embodiment, the integration system 435 can communicate with both the third-party back office 410 and the customer premise equipment in order to ensure the continued functionality of the customer premise equipment running the content provided by the third-party back office 410 without service interruptions. Additionally, the integration system 435 can provide requisite information to various subsystems of the home network, including existing cable systems 430, in order to both monitor the customer premise equipment running the third-party back office content and to bill accordingly to one or more accounts associated with users of the home network in order to generate revenue from the presentation of the third-party content on the customer premise equipment of the home network 405.

In some embodiments, the integration system 435 may be in communication with a billing system 440. The billing system 440 may include billing information associated with user devices on the home network. The billing system 440 may be also responsible for charging an account associated with a user device for providing data and/or media (for example, video and/or audio, audiovisual hereinafter). In some embodiments, the integration system 404 may be in communication with existing cable systems 430, such as an account management system (not shown). In one embodiment, the account management system may be responsible for determining whether a user account associated with a particular user device is authorized to view particular content. For example, the account management system may include information specifying that an account have a specific account ID number associated with a user device ID number, is authorized to view on demand content of a particular TV channel. In one embodiment, the account management system may include information data mapping account ID numbers to user devices ID numbers. The account management system may maintain other information associated with a level of authorization associated with each account.

In some embodiments, a content management system (not shown) may be in direct communication with the integration system 435. In one embodiment, the content management system may be responsible for identifying which content is available to a particular user. For example, the content management system may determine whether particular content is available in a specific region where a user device is located. Similarly, the content management system may determine whether a particular user device is authorized to access specific content based on information received from the account management system.

In one embodiment, the integration system 435 may facilitate communications between the billing system 440, the account management system, the content management system the cable management system and user devices. In some embodiments, each of the above may belong to and/or be configured to operate on a different third-party network and may only be enabled to communicate via particular protocols. In some embodiments, the integration system 435 may ensure that each system receives information required for operation of the respective system in a protocol supported by the respective system.

Figure 5:
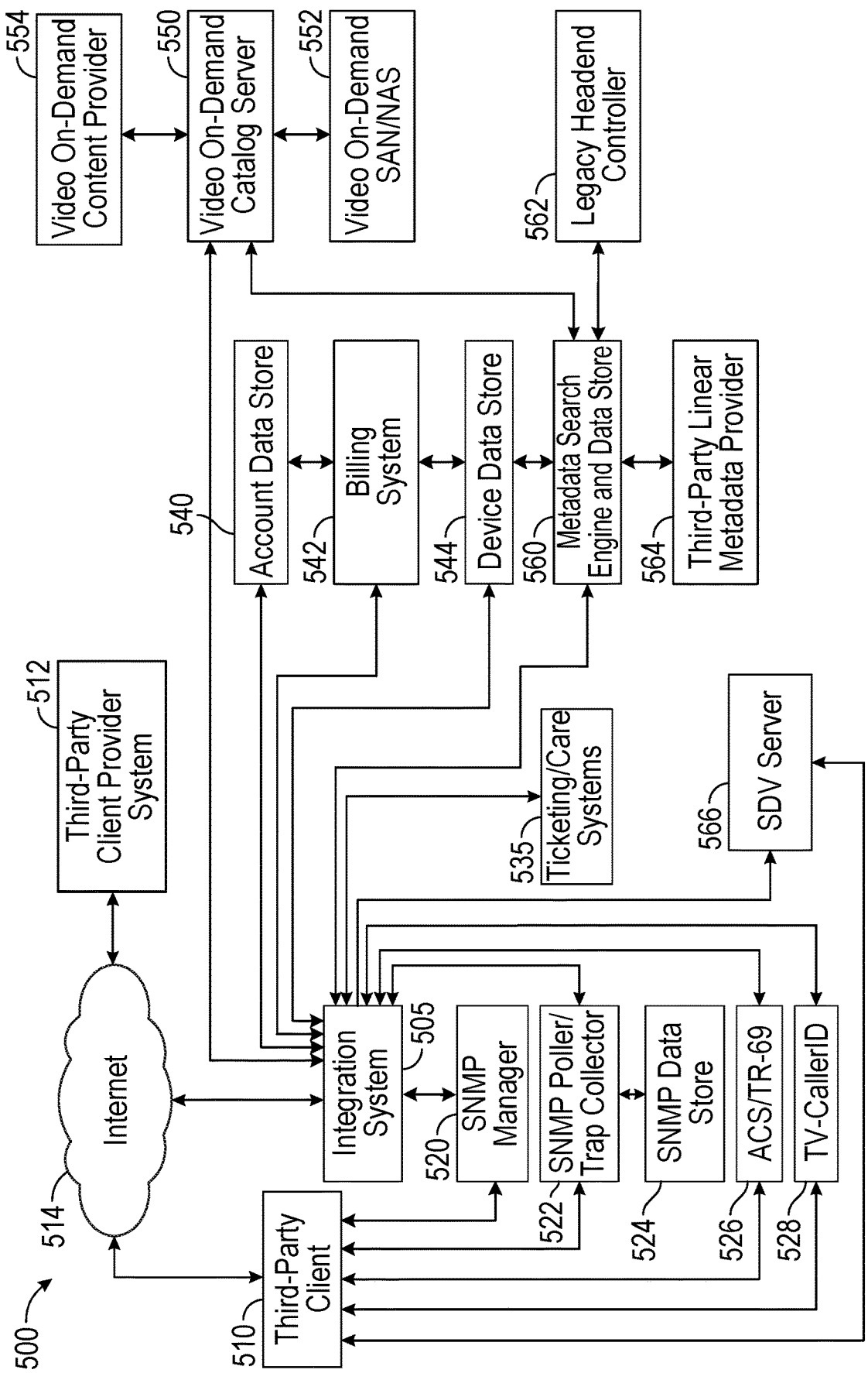
FIG. 5 shows a diagram representing an additional level of detail of the diagram shown in FIG. 4, which described the system architecture including the integration system in accordance with one or more example embodiments.

FIG. 5 shows a diagram 500 that represents an additional level of further detail of the diagram 400, which described the system architecture including the integration system in accordance with one or more example embodiments of the disclosure. In one embodiment, the integration system 505 can be generally similar to the integration system 435, shown and described in connection with FIG. 4. In another embodiment, the operations performed by the integration system 505 may also be generally similar to the operations of the integration system 435. In the depicted embodiment the integration system 505 can be in communication with additional systems.

In particular, diagram 500 includes an integration system 505 that communicates with a third-party video client 510 in association with a third-party video client provider system 512. In an embodiment, the third-party video client can include a customer premise device. In another embodiment, the third-party video client provider system 512 can be present in a third-party back office associated with a third-party network. In one embodiment, the integration system 505 can provide service assurance functionality to third-party video client 510 using a plurality of functional modules, including for example, but not limited to, an Image result for a simple network management protocol (SNMP) manager 520, an SNMP polar/trap collector 522, in association with an SNMP data store 524 and an auto configuration server (ACS)/technical report (TR)-69 module 526. In one embodiment, the integration system 505 can send a management information base (MIB) query to the SNMP manager 522. The SNMP manager 520 can thereby send an SNMP get/walk request to the third-party video client 510. In one embodiment, the integration system 505 can send one or more alerts to the SNMP polar/trap collector 522. In another embodiment, the third-party video client 510 can transmit an SNMP trap to the SNMP polar/trap collector module 522. In one embodiment, the SNMP polar/trap collector 522 can store one or more SNMP alerts at an SNMP data store 524. In one embodiment, the integration system 505 can transmit a TR-69 query to an ACS/TR-69 module 526. In another embodiment, the ACS/TR-69 module 526 can send a TR-69 query to a third-party video client 510. In this way, the integration system 505 can provide service assurance functionality to the third-party client 510.

In one embodiment, the integration system 505 can provide banner/notifications to a TV-CallerID 528 module. In another embodiment the TV-CallerID module 528 can provide banner/notifications to the third-party video client 510. In one embodiment, the TV-CallerID module 528 can provide an application level functionality to the integration system 505.

In one embodiment, the integration system 505 can transmit through the Internet 514 a VOD content check, an update and/or publish as needed requests to a third-party video client provider system 512. In another embodiment, the integration system can transmit linear metadata channel and/or SDV push data over the Internet to the third-party video client provider system 512. In one embodiment, the integration system 505 can provide an entitlements push over the Internet to the third-party video client provider system 512.

In one embodiment, the integration system 505 can send and receive information associated with the device and account provisioning push or receive data over the Internet to the third-party video client provider system. In an embodiment, the integration system 505 can transmit data indicative of on demand entitlements checking over the Internet to the third-party video client provider system 512. In one embodiment, the third-party video client provider system 512 can transmit network monitoring tools (NMS) diagnostic checks and/or data indicative thereof, through the Internet, to the integration system 505. In another embodiment, the integration system 505 can send and receive ticketing/e-bonding information to and from the third-party video client provider system 512.

In one embodiment, the third-party video client provider 510 can send and receive information such as content from the third-party video client provider system 512 over the Internet 514. In one embodiment, an account data store module 540, a legacy billing system 542, and/or a device data store 544 can be used in association with the integration system 505 to provide account provisioning and/or entitlement functionality to the system shown in diagram 500. In one embodiment, the integration system 505 can query account information from the account data store 540. In another embodiment, the integration system can monitor provisioning events from the legacy billing system 542. In one embodiment, the legacy billing system 542 can transmit account provisioning events to the account data store 540. In another embodiment, the legacy billing system 542 can provide data indicative of device provisioning events to the device data store 544. In one embodiment, the integration system 505 can query device information from the device data store 544.

In one embodiment, the integration system 505 can send and receive information from a ticketing and/or care systems module 535 in order to provide service assurance functionality to the third-party video client and/or any other systems shown in diagram 500. In an embodiment, the integration system 505 can transmit data to a metadata search engine and data store module 560. In another embodiment, the metadata search engine and data store 560 in association with the legacy headend controller 562 and/or a third-party linear metadata provider 564 can provide metadata functionality to the one or more systems shown and described in connection with diagram 500, including the third-party video client 510. In one embodiment, the metadata search engine and data store 560 can retrieve channel lineup metadata from the legacy headend controller 562. In another embodiment, the metadata search engine and data store 560 can transmit information to retrieve linear metadata from a third-party linear metadata provider 564. In one embodiment, the metadata search engine and data store 560 can retrieve VOD metadata, for example, by pulling for the VOD metadata from a video on demand catalog server 550. In one embodiment, the video on demand catalog server 550 in association with a video on demand storage area networks (SANs) and/or network attached storage (NAS) 552 and/or a video on demand content provider 554 can provide metadata (VOD) functionality to the one or more systems shown in diagram 500 for the integration system 505 to operate with the third-party video client 510 and/or the third-party video client provider system 512.

In one embodiment, the integration system 505 can listen for VOD catalog events from the video on demand catalog server 550. In one embodiment, the video on demand catalog server 550 can store video files on a video on demand SAN and/or NAS 552. In one embodiment, the video on demand content provider 554 can transmit new VOD content events such as, for example, metadata and/or video files to the video on demand catalog server 550. In one embodiment, the integration system 505 can retrieve SDV channel information from an SDV server 556.

In one embodiment, the third-party video client 510 can send and receive information related to a standard SDV tune activity, for example, a channel change and/or a mini carousel-style activity associated with the SDV server and/or the third-party video client.

Figure 6:
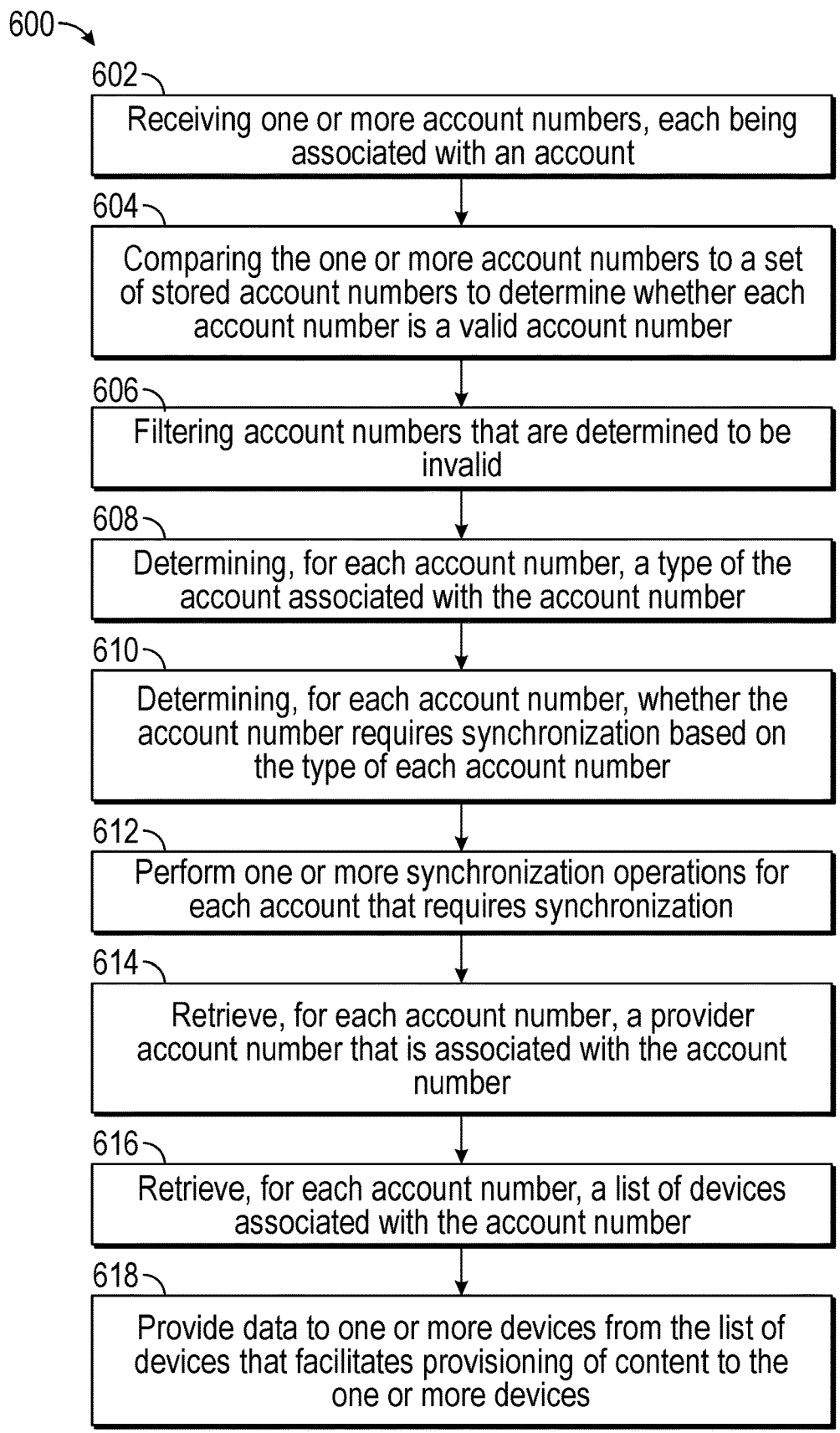
FIG. 6 shows an example flow diagram showing example procedures and operations of the disclosed integration system that may be completed in accordance with one or more example embodiments of the disclosure.

FIG. 6 is a flow chart illustrating example process 600 in accordance with various embodiments of the present disclosure. The process 600 may begin, at block 602, with receiving one or more account numbers each being associated with an account. In one embodiment, integration system may receive one or more account numbers or IDs being associated with a particular account for receiving audiovisual data, for example, audiovisual data associated with a cable channel, VOD content, broadcast, and the like. In one embodiment, integration system may receive the above indicated information from one or more computers associated with the third-party network, for example, over the Internet. In one embodiment, the accounts associated with the one or more account numbers may have different authorizations associated with the particular account. In one embodiment, for example, the account may have a cable package that includes authorization to view a plurality of channels (for example, 50, 100, 200 and/or the like), a particular category of channels, and/or any other such restriction. In another embodiment, other accounts may for example have a cable package that includes authorization to view local channels (for example, 10, 15, 20 and/or the like).

The process 600 may then continue, at block 604, with comparing the one or more account numbers to a set of stored account numbers to determine whether an account number is a valid account number. In one embodiment, the integration system can perform operations for comparing the received account numbers to the stored account numbers to determine if information associated with the account is available and whether the account numbers are valid. In one embodiment, the integration system can use one or more databases and/or storage systems to retrieve the stored account number for the comparison.

The process 600 may then continue, at block 606, with filtering account numbers that are determined to be invalid. In one embodiment, the integration system may execute one or more operations to perform the filtering. In one embodiment, the account numbers that are not found in the stored account numbers during the comparison may be removed or filtered.

The process 600 may then determine, at block 608, for each account number, a type of the account associated with the account number. For example, an account may be determined to be a target account, a previous account, or a transfer account. In one embodiment, a target account can refer to an account that is to be targeted for registration, payment, special content delivery, and the like. In one embodiment, a previous account can refer to an account that was previously held by one or more users for at least a period of time. In one embodiment, a transfer account can refer to an account that was originally associated with a different network, but that has been registered and/or transferred to the home network.

The process 600 may then continue, at block 610, with determining, for each account number, whether the account number requires synchronization based on the type of each account number. In one embodiment, the integration system may perform operations to determine that an account requires synchronization based on determining that the account is a previous account or a target account. In one embodiment, the synchronization may include the transmission of information between the home network and the third-party network to provide the account with current information. In some embodiments, the results may be cached to increase the performance of the integration system, for example, the communications between the integration system and one or more computers on the home network and/or the third-party network.

The process 600 may then, at block 612, perform one or more synchronization operations for each account that requires synchronization. In one embodiment, the integration system may obtain data associated with the account from the any or all of the subsystems shown and described in connection with FIGS. 4-5 to update information associated with a given account. In one embodiment, for example, channel information, authorizations and permissions, billings, and the like can be updated on the account. In one embodiment, the results may be cached to enhance the performance. In one embodiment, the caching of the data can be performed on any storage devices associated with the home network.

The process 600 may then, at block 614, continue with retrieving, for each account number, a third party provider account number that is associated with the account number. In one embodiment, the integration system may determine that a third-party provider account number is associated with the account number based on information from a third-provider network's servers. In one embodiment, the account number may be associated with customer premise equipment deployed by the home network at the client side (for example, set-top boxes, laptops, tablets, routers and/or the like).

In turn, the process 600 may retrieve, at block 616, for each account number, a list of devices associated with the account number. In one embodiment, the account number may be associated with a plurality of set-top boxes in a particular household (for example, living room set-top box, bedroom set-top box, and/or the like). The integration system may determine a list of devices associated with the account number and the household. The process 600 may continue, at block 618, to provide data to one or more devices from the list of devices that facilitates provisioning of content to the one or more devices. In one embodiment, the integration system can provide the data it retrieves from the third-party network (for example, based at least in part on one or more operations described in connection with FIG. 6) to the one or more devices (for example, set-top boxes, tablets, laptops, and the like).

Figure 7:
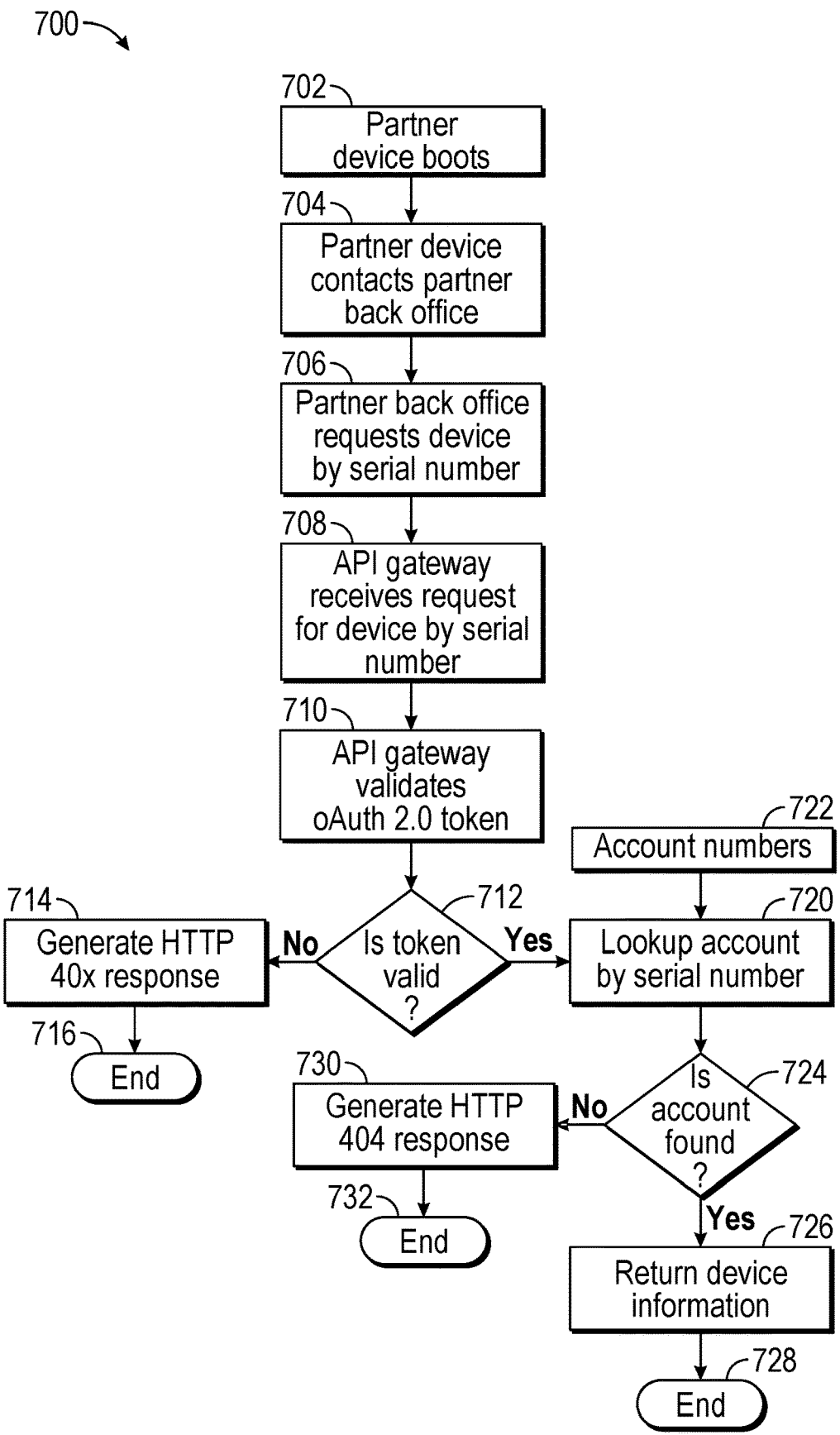
FIG. 7 shows an example flow diagram describing an example operation associated with a provisioning and/or entitlement functionality of the integration system, in accordance with one or more example embodiments of the disclosure.

FIGS. 7-16 are flow charts illustrating various example procedures and operations that may be completed in accordance with various embodiments of the present disclosure. In particular, FIG. 7 shows an example flow diagram 700, describing an example operation associated with a provisioning and/or entitlement functionality of the integration system, in accordance with one or more example embodiments of the disclosure.

At block 702, a partner device (that is, a third-party device) can boot. In one embodiment the partner device can include a set top box, a laptop, a tablet, and/or any other suitable device, as described throughout this disclosure. In an embodiment, the partner device may boot based on a user interaction, for example, a user plugging in the device. In another embodiment, the partner device may boot automatically as a result of being connected to a network, for example a home network and/or a third-party cable network.

At block 704, the partner device can contact a partner back office. As used herein a partner back office can be used interchangeably with a third-party network, and/or one or more third-party network computers. In an embodiment, the partner device can use a third-party client application to communicate over a network, for example, the Internet, to communicate with the third-party back office. In one embodiment, the partner device contacting the partner back office may include sending and receiving data and/or metadata to facilitate a connection between the partner device and the back office.

At block 706, the partner back office can request a device by a serial number. In one embodiment, the device requested by the partner back office can include the partner device that was booted at block 702. In an embodiment, the partner back office requesting the device by the serial number can include at least one operation executed by one or more partner back office computer(s) communicating over a network, for example, the Internet, to an integration system located, for example, at the home network.

At block 708, an application programming interface (API) gateway can receive the request for the device by serial number from the partner back office. In an embodiment, the API gateway can be running or operational on the integration system on the home network. In an embodiment, the API gateway receiving the request for device by serial number may include the API gateway receiving data and/or metadata indicative of the request from the partner back office. In an embodiment, the request for device by serial number may include an authorization token.

At block 710, the API gateway, for example, on the integration system of the home network can validate an authorization token associated with the request for the device by serial number, received from the partner back office by the integration system operational on the home network. In an embodiment, the validation of the authorization token can comprise computational operations that determine whether the authorization token is valid or invalid, for example, based on running one or more tests on the authorization token. In one embodiment, the authorization token can include an authorization 2.0 token. In one embodiment, OAuth 2.0 can refer to an open standard for access delegation, which can be used as a way for Internet users to grant websites or applications access to their information on other websites but without giving them the passwords.

At block 712, the integration system and/or the API gateway can determine whether or not the token validated at block 710 is valid or invalid. In an embodiment, the determination can be based on the operations described in connection with block 710. In an embodiment, if it is determined that the token is invalid, then at block 714, the integration system and/or the API gateway can generate a response indicative of the token being invalid.

For example, as shown at block 714, the integration system and/or the API gateway can generate an HTTP 40x response, indicative of the token being invalid, after which, at block 716, the flow diagram 700 describing the operation of the provisioning and/or entitlement functionality associated with the integration system can end.

Alternatively, if at the result of the determination step at block 712 of whether the token is invalid or valid, it is determined that the token is valid, then, at block 720, the integration system can perform an account lookup using a serial number. In an embodiment, the account lookup can be performed by the integration system, for example, by contacting one or more search databases that store devices and/or accounts by serial number or any other association. In an embodiment, the one or more account numbers can be transmitted to the integration system, as shown at block 722, for the determination of the account by serial numbers.

At block 724, a determination can be made on whether the account has been found based on the operation executed by the integration system at block 720. The determination on whether the account has been found can be made, for example, from a result of the search query based on one or more account numbers, as described in connection with block 720.

If it is determined that the account is not found, then as shown at block 730, the integration system and/or the API gateway can generate a response indicative of the failure to find the account. For example, as shown at block 730, the integration system and/or the API gateway can generate an Hypertext Transfer Protocol (HTTP) 404 response, indicative of the failure to find the account. Further, at block 732, the flow diagram 700 that describes an aspect of the functionality of provisioning and/or entitlement functionality can come to an end.

Alternatively, if the result of the account search, as described in connection with block 724 results in the account being found, then at block 726, the integration system and/or the API gateway can return a device information to one or more partner devices, for example, one or more partner devices running on a third-party network. For example, the partner device as described in connection with block 702, after which the operations associated with the flow diagram for the provisioning and/or entitlement functionality of the integration system can come to an end at block 728.

Figure 8:
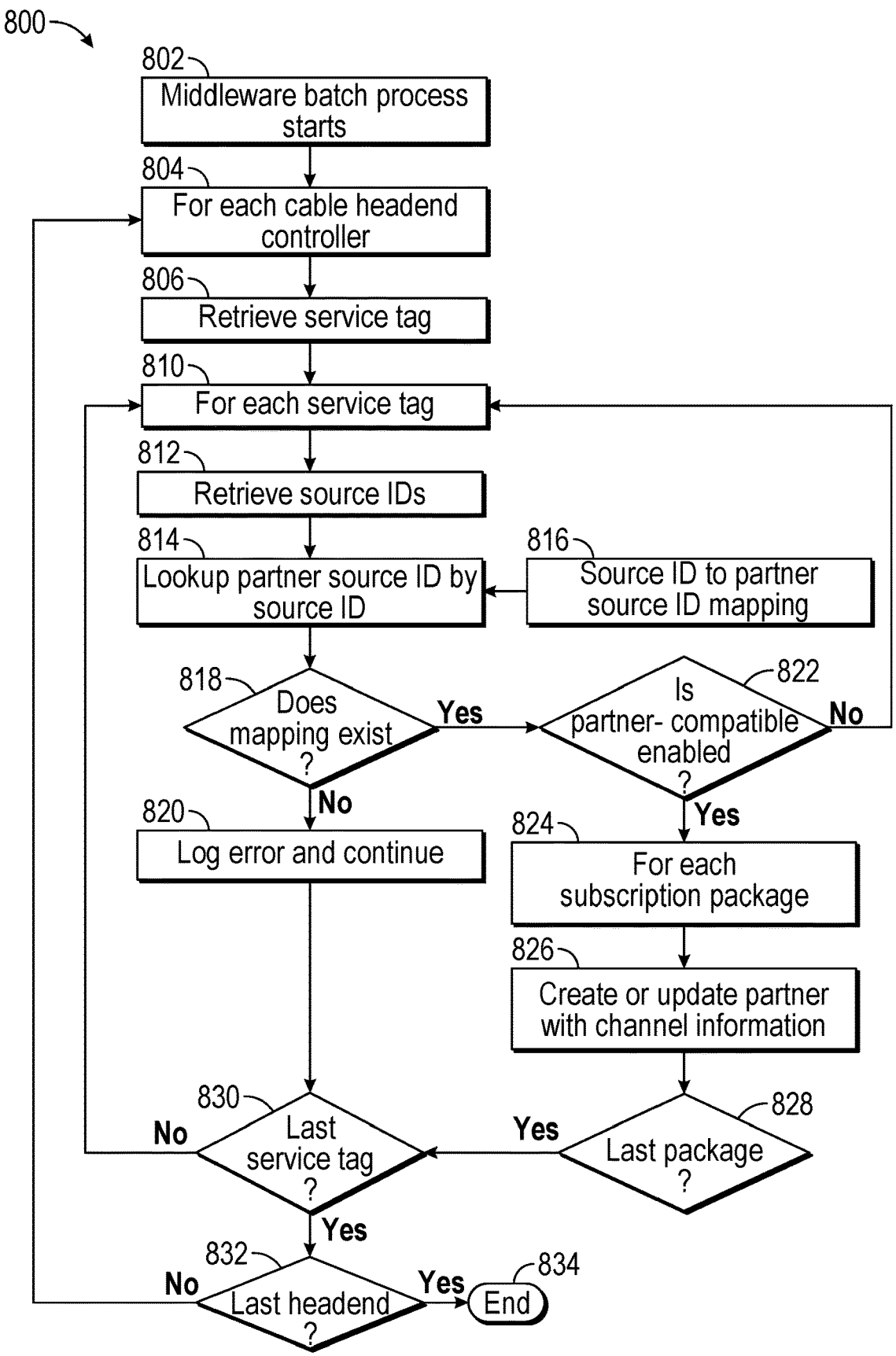
FIG. 8 shows an example flow diagram describing an example operation associated with a metadata and/or service assurance functionality of the integration system, in accordance with one or more example embodiments of the disclosure.

FIG. 8 shows an example flow diagram 800 describing an example operation associated with a metadata and/or service assurance functionality of the integration system, in accordance with one or more example embodiments of the disclosure.

At block 802, a middleware batch process can start on the integration system. In one embodiment, such a middleware batch process can include a process that executes cyclically. For example, once every 30 minutes or one hour (or more or less), in order to, for example, synchronize one or more legacy systems. For example, one or more legacy billing systems and the like, with one or more applications running on, for example, a customer premise equipment having third-party client applications installed.

At block 804, the integration system can execute one or more operations identify a cable headend controller. In an embodiment there can be many cable headend controllers, for example, many cable headend controllers associated with different regions or associated with different geographic regions of a network. In an embodiment, the cable and controller can be centralized in a data center. In one embodiment, the cable headend controller can include a server.

At block 806, the integration system can run one or more operations that retrieve a service tag associated with a cable headend controller. In an embodiment, the service tag associated with a given cable headend controller can serve to identify the cable headend controller.

At block 810, the integration system can run one or more operations to identify the service tag in order to run further operations associated with each headend controller having the given service tag. For example, at block 812, the integration system can execute one or more operations to retrieve one or more source IDS associated with the service tag and/or the cable headend controller.

At block 814, the integration system can execute one or more operations to look up a partner source ID associated with a third-party back office, for example, using the source IDs retrieved at block 812. In one embodiment, the operations to look up the partner source ID using the retrieved source IDs from block 812 can be determined based in part on a source ID to partner source ID mapping, as shown at block 816. In an embodiment, the source ID to partner source ID mapping can include a table and/or a chart that maps a source ID on the home network to a third-party source ID on the third-party network. For example, the source ID to partner source ID mapping can include an indication that a first source on a first frequency corresponds to a first channel on the home network, which can be mapped to a second source on a second frequency corresponding to the same channel on the third-party network.

At block 818, the integration system can perform operations to determine whether the result of the lookup of the partner source ID by the source IDs retrieved at block 812 and executed at block 814 exist or do not exist. If it is determined at block 818 that the mapping does not exist, then at block 820 an error can be logged, for example, in one or more databases associated with the integration system and the process flow can continue to block 830.

Alternatively, if the determination is made at block 818 that the mapping does exist, then the operations associated with the flow diagram continue to block 822, where it is determined, by the integration system, whether the cable headend controller identified by the source ID and/or the service tag, is partner compatible enabled or not. If it is determined at block 822 that the cable headend controller associated with the source ID and/or the service tag is not partner compatible enabled, then the operations associated with the flow diagram can continue back to block 810, where a next service tag is determined based on the retrieved service tags found at block 806.

If, on the other hand, the cable headend controller associated with the source ID and/or the service tag is determined to be partner compatible enabled at block 822, then the operations associated with the flow diagram continue to block 824 where each subscription package associated with the service tag is determined. Thereafter, the operations associated with the flow diagram continue to block 826, wherein for each subscription package associated with the service tag determined at block 824, a third-party partner device and/or application associated with the third-party back office can be created and/or updated, for example, with channel information or any other associated information, for example, updated source mismatch information or reconciliation information.

At block 828, the operations associated with the flow diagram determine whether there are any other subscription packages available for analysis and updating. If the result is that it is indeed the last subscription package for creation and/or updating of the third-party partner with the channel information at block 828, then the operations associated with the flow diagram continue to block 830, where it is determined whether the service tag being considered for the operations of the previous blocks is indeed a last service tag.

If the result of the determination at block 830 is that the service tag is the last service tag, then the operation continues to block 832, where it is determined whether the cable headend controller is the last headend. If it is determined that the cable headend controller is the last headend, then at block 834 the operations associated with the flow diagram describing the example operation associated with the metadata and/or service assurance functionality of the integration system come to an end.

If, on the other hand, at block 832 it is determined that there are more cable headend controllers for analysis, then the operations continue to block 804, where the process continues accordingly, as described above for another cable headend controller. In this way, the middleware batch process, shown and described in connection with diagram 800, can determine a mapping between cable headend controller systems on the home network and one or more third-party partner source ID devices and/or applications associated with the third-party back office.

Figure 9:
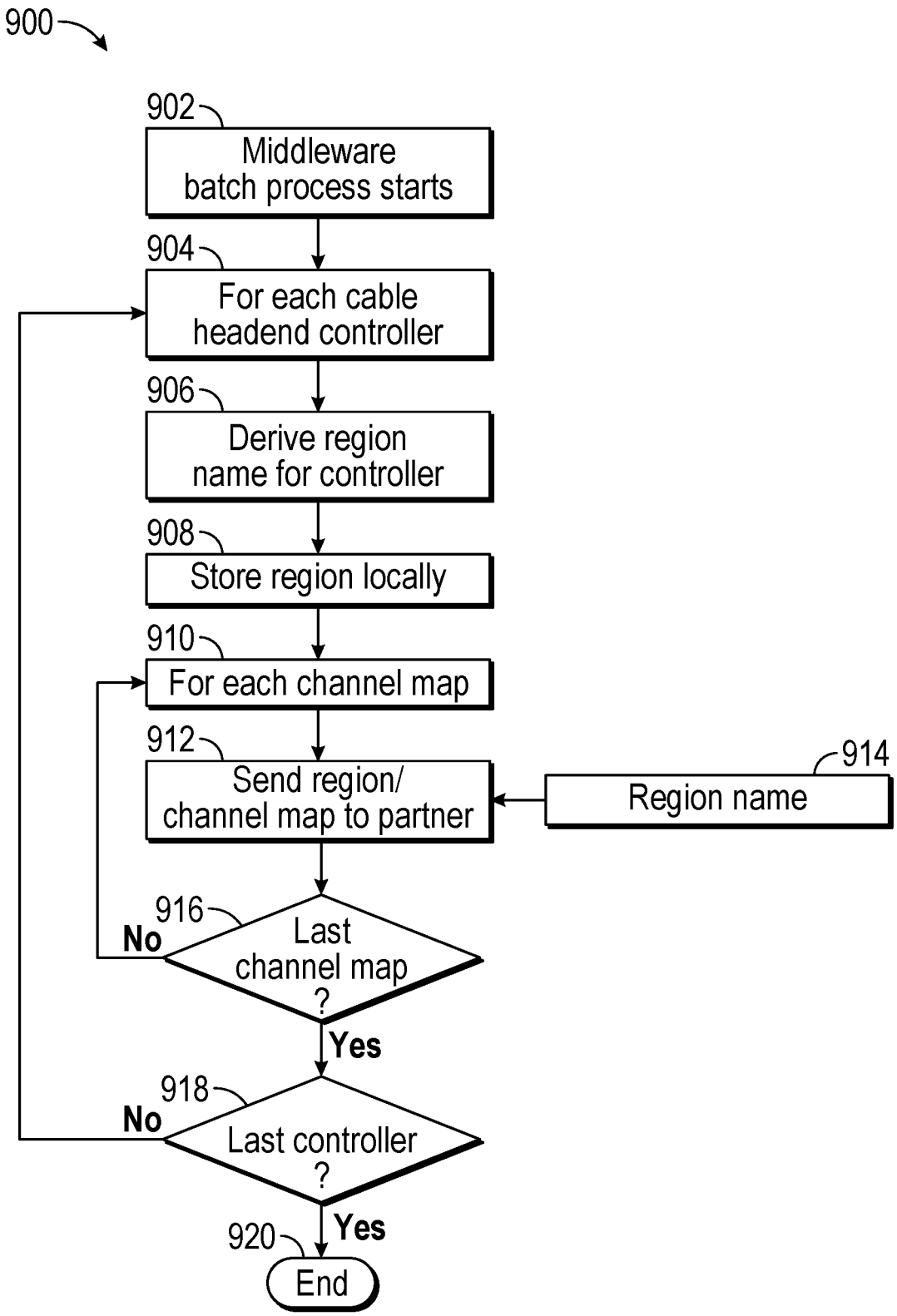
FIG. 9 shows an example flow diagram describing an example operation associated with a metadata functionality of the integration system, in accordance with one or more example embodiments of the disclosure.

FIG. 9 shows an example flow diagram 900 that describes an example operation associated with a metadata functionality of the integration system, in accordance with one or more example embodiments of the disclosure. In one embodiment, the operations associated with the flow, as shown in diagram 900, can describe operations that address a situation where a third-party back office can operate on a different level of granularity with respect to account provisioning and/or metadata, as compared with a home network. For example, the home network may be configured to operate on a headend controller level associated with one or more markets on the home network or addressed by the home network, whereas the third-party back office may have one or more applications that operate on a geographic region level to service their respective network.

At block 902, a middleware batch process can initiate or start. In an embodiment, the middleware batch process can execute operations to address the situation described above. In an example embodiment, the middleware batch process can run periodically, for example, once every hour and/or half hour, in order to continuously monitor and update channel mappings between the home network and the third-party network.

At block 904, each cable headend controller can be identified for the performing of one or more operations described below. In an embodiment, each cable headend controller can be associated with a different market addressed by the home network. In an embodiment, one or more of the cable headend controllers can include legacy cable headend controllers and/or associated legacy peripheral devices.

At block 906, the integration system can perform operations to derive a region name for a given cable headend controller. In an embodiment, the derivation of the region name can be determined based on any number of associated factors. For example, an IP address associated with the cable headend controller, a Global Positioning System (GPS) determined location of a given cable headend controller, and/or any other identifying information.

At block 908, the integration system can execute operations to store the region information locally that is on one or more storage media associated with the integration system and/or one or more databases associated with the integration system.

At block 910, the integration system can execute operations to determine for each channel map associated with the home network to perform operations described in connection with block 912, that is send region and/or channel maps to a third-party partner back office.

In other words, at blocks 910 and 912, the integration system can determine a channel map that maps the stored regions of block 908 with internal channel maps based on markets associated with the home network for transmission to the third-party back office. In one embodiment, one or more region names, as shown at block 914, can be used in association with the transmission of the region and/or channel map to the third-party partner back office, as shown at block 912. In an embodiment, the region/channel map can include a table that maps a given region associated with the third-party back office with a channel map that is based on one or more markets associated with the home network.

At block 916, the integration system can perform operations to determine whether the channel map is the last channel map being considered for a given cable headend controller. If it is determined as a result of the operations executed at block 916, that it is not the last channel map, then the flow operations can continue to block 910, where the next channel map is considered.

If, on the other hand, the operation is executed to determine that the channel map is a last channel map at block 916, then the flow of operations continues to block 918, where the integration system can determine whether the cable headend controller is the last controller being considered by the middleware batch process.

If it is determined, as a result of the operations executed at block 918, that the cable headend controller is not the last cable headend controller considered by the middleware batch process, then the operations can continue to block 904, where a next cable headend controller is considered. If, on the other hand, it is determined as a result of the operations being executed at block 918 that the headend controller is indeed the last controller, then the operations can continue to block 920, where the example operations associated with the flow diagram 900 for the metadata functionality of the integration system come to an end.

Figure 10:
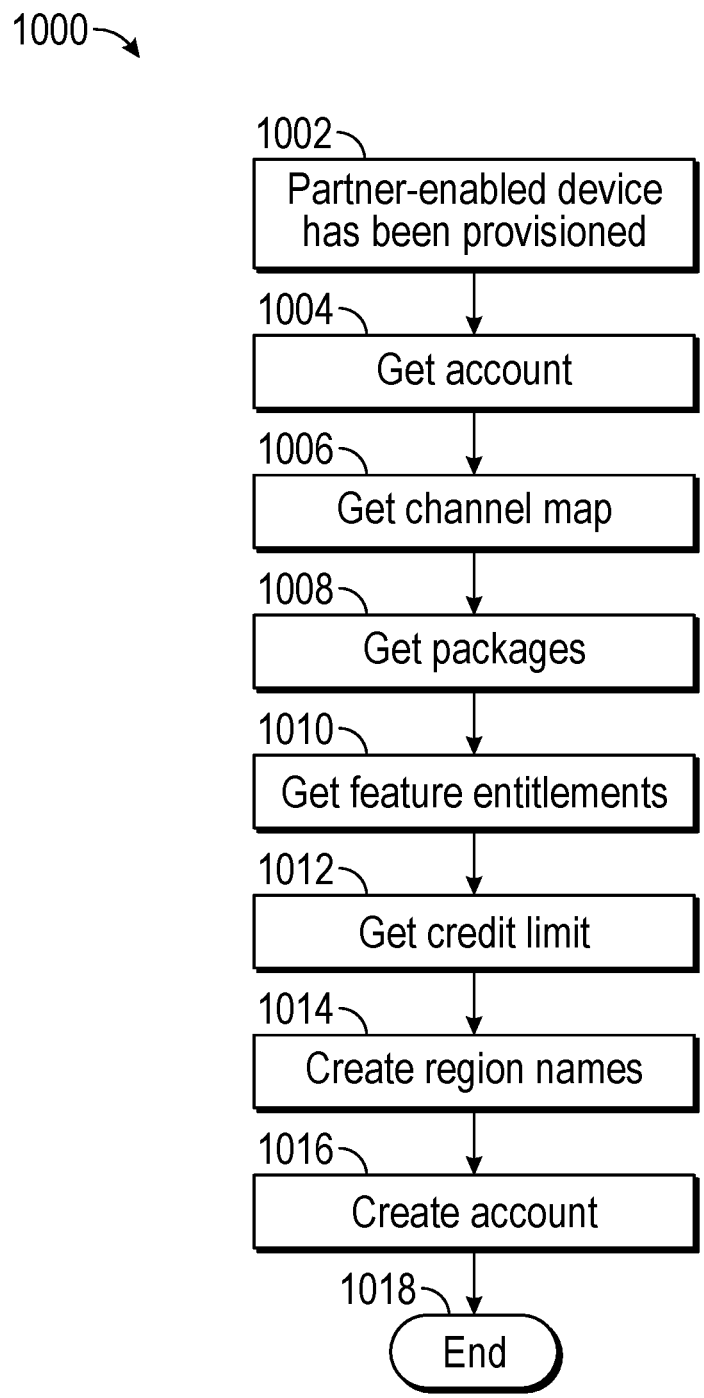
FIG. 10 shows an example flow diagram describing example operation associated with a provisioning and/or entitlements functionality of the integration system, in accordance with one or more example embodiments of the disclosure.

FIG. 10 shows an example flow diagram 1000, describing example operation associated with a provisioning and/or entitlements functionality of the integration system, in accordance with one or more example embodiments of the disclosure. In one embodiment, the operations can begin at block 1002, where a partner-enabled device can be determined to have been provisioned. In an embodiment, the partner-enabled device can include a set top box. For example, a set top box associated with a home network.

As such, the operations can continue to block 1004, where the integration system can obtain an account and/or account information associated with the partner-enabled device that has been provisioned in accordance with or as described at block 1002. For example, in an embodiment, the integration can execute operations to receive and/or transmit data to the partner-enabled device to obtain the account information associated with the account.

At block 1006, the integration system can execute operations to obtain a channel map associated with the partner-enabled device that has been provisioned as shown at block 1002, and for which an account has been obtained, as shown at block 1004. In an embodiment, the channel map can be obtained based, at least in part, on data that is transmitted and/or received by the integration system from communications between the integration system on the home network and the partner-enabled device.

In an embodiment, at block 1008, the integration system can execute operations to obtain one or more packages. For example, channel packages and/or cable network packages associated with the partner-enabled device shown at block 1002 and/or the account as obtained at block 1004.

At block 1010, one or more feature entitlements can be obtained for the partner-enabled device, as shown at block 1002, for an account as described at block 1004.

At block 1012, a credit limit can be obtained for the partner-enabled device and/or the account as determined at block 1004. In one embodiment, the credit limit may be associated with the amount of credits available to a given user associated with an account. For example, the amount of credits that are allowed to watch a particular program by a given user associated with the account. In an embodiment, the credit limit may be associated with a monetary value paid by the user to obtain such a credit. In an embodiment, the credit limit may be transmitted from the partner-enabled device over the Internet to the integration system.

At block 1014, the integration system can create and/or generate one or more region names. In an embodiment, the region names can be associated with the regions that are addressed by the third-party back office network. In one embodiment, the creation of the region names can be associated with or based at least in part on the channel map. For example, the channel map obtained as described in connection with block 1006.

At block 1016, the integration system can execute operations to create an account. For example, an account that is different than the account obtained in step 1004, but based on the information gathered from the operations in steps 1004, 1006, 1008, 1010, 1012, and/or 1014.

In an embodiment, the account created in step 1016 can be indicative of a mapping of the account of the third-party back office network, with an account on the home network. In other words, there can be a one to one mapping of accounts between the two networks, that is the back office third-party network, and the home network. At block 1018, the flow diagram for the example operations associated with the provisioning and/or entitlements fine functionality of the integration system can come to an end.

Figure 11:
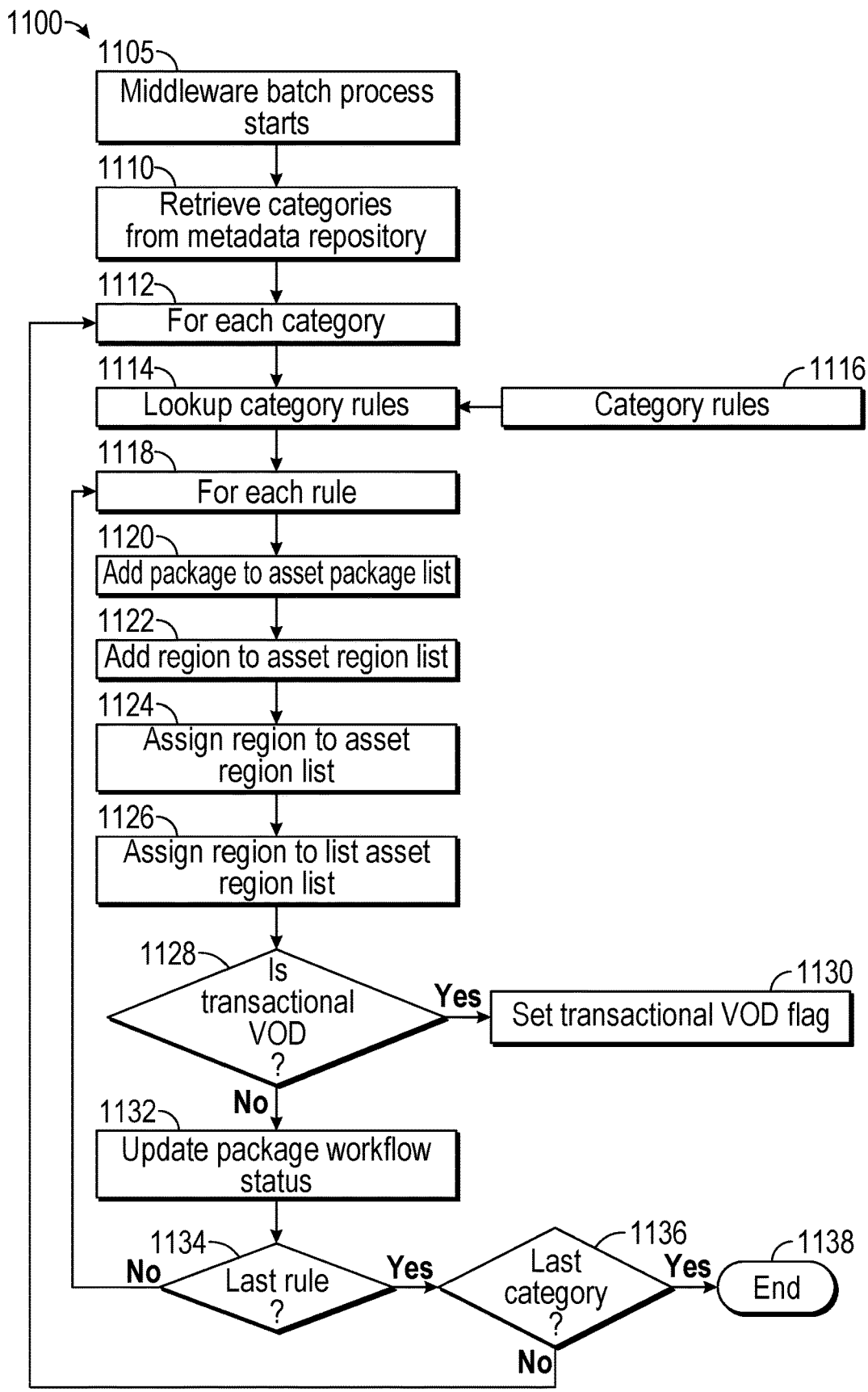
FIG. 11 shows an example flow diagram describing example operation associated with a metadata and/or provisioning functionality of the integration system, in accordance with one or more example embodiments of the disclosure.

FIG. 11 shows an example flow diagram 1100, describing example operation associated with a metadata and/or provisioning functionality of the integration system, in accordance with one or more example embodiments of the disclosure. In an embodiment, the operations described in the flow diagram 1100 can facilitate the embodiment of one or more rules associated with content provided by the third-party backend network. The rules indicative of, for example, account permissions to be determined in associated with the provided content. In an embodiment, the rules can be enforced on the home network, though the content is provided by a third-party network.

At block 1105, a middleware batch process can start. In an embodiment, the middleware batch process can be executed periodically, for example, once every half hour or once every hour.

At block 1110, the integration system can execute our operations to retrieve one or more categories from a metadata repository. In an embodiment, the metadata repository can be stored on a storage device associated with the integration system. In an embodiment, the categories can correspond to different types of content that are associated with the content provided by a third-party backend office network. In an embodiment, the categories can correspond to the VOD package category associated with the content.

At block 1112, the integration system can perform operations on each category of the retrieved categories, shown in connection with block 1110. At block 1114, the integration system can perform operations to look up one or more category rules. In an embodiment, the one or more category rules can be determined based on category rules input (block 1116). In an embodiment, the category rules can be stored on a storage device associated with or in communication with the integration system. In an embodiment, the category rules can be rules that are associated with the home network.

In an embodiment, the category rules can include rules associated with authorization, content, and/or entitlement for a given account. For example, one category rule may specific that a given content is not suitable for viewing by a minor. Another category rule may indicate that the content is not presentable due to a lack of authorization, for example, because of copyrights.

At block 1118, the middleware batch process being executed by the integration system can consider each rule and perform operations to be discussed below for each rule. For example, at block 1120, the integration system can execute operations to add a given package, for example a cable package, to an asset package list. In an embodiment, the asset package list could then be used by the integration system to determine which account of one or more accounts being used on the home network can access the asset packages described in the asset package list in accordance with a given rule identified at block 1118.

At block 1122, the integration system can execute operations to add a given region to an asset region list. In an embodiment, the asset region list can include a list that is indicative of a region in which an asset is accessible and/or available for customers on the home network.

At block 1128, the integration system can execute operations to determine whether the package assets and/or category is associated with a transactional VOD. In an embodiment, such a transactional VOD may include a pay-per-view (PPV) content.

If it is determined at block 1128 that a transactional VOD exists, then the operations continue to block 1130, where the integration system can execute operations to set a transactional VOD flag. In an embodiment, the transactional VOD flag can provide the integration system with the method to perform additional functionality to address the transactional VOD nature of the category package and/or asset.

Furthermore, the operations associated with the flow diagram can continue thereafter to block 1132, where the integration system can execute operations to update a package workflow status in accordance with the setting of the transactional VOD flag, as shown at block 1130.

Alternatively, if at block 1128 it is determined that a transactional VOD is not present, then the flow of operations can continue also to block 1132, where the integration system can execute one or more operations to update a package workflow status to indicate that the package category and/or asset is not a transactional VOD in nature.

At this point, the operational flow can continue to block 1134, where the integration system can execute operations to determine whether the rule being processed is a last rule for the category rules determined at blocks 1112 and/or blocks 1114, in association with block 1116.

If it is not determined to be the last rule at block 1134, then the operational flow continues back to block 1118 and the ensuing operations continue accordingly. If, on the other hand, the integration system determines that it is indeed a last rule at block 1134, then the operational flow continues to block 1136, where the integration system executes one or more operations to determine whether the category is a last category.

If it is determined as a result of the operations of block 1136 that the category is not a last category, then the operations can continue to block 1112, where the integration system can determine the next category and can perform the ensuing operations accordingly. If, on the other hand, the integration system determines at block 1136 that the category is indeed the last category, then the operations continue to block 1138, where the operational flow that describes the example metadata and/or provisioning functionality associated with the operations in diagram 1100 come to an end.

Figure 12:
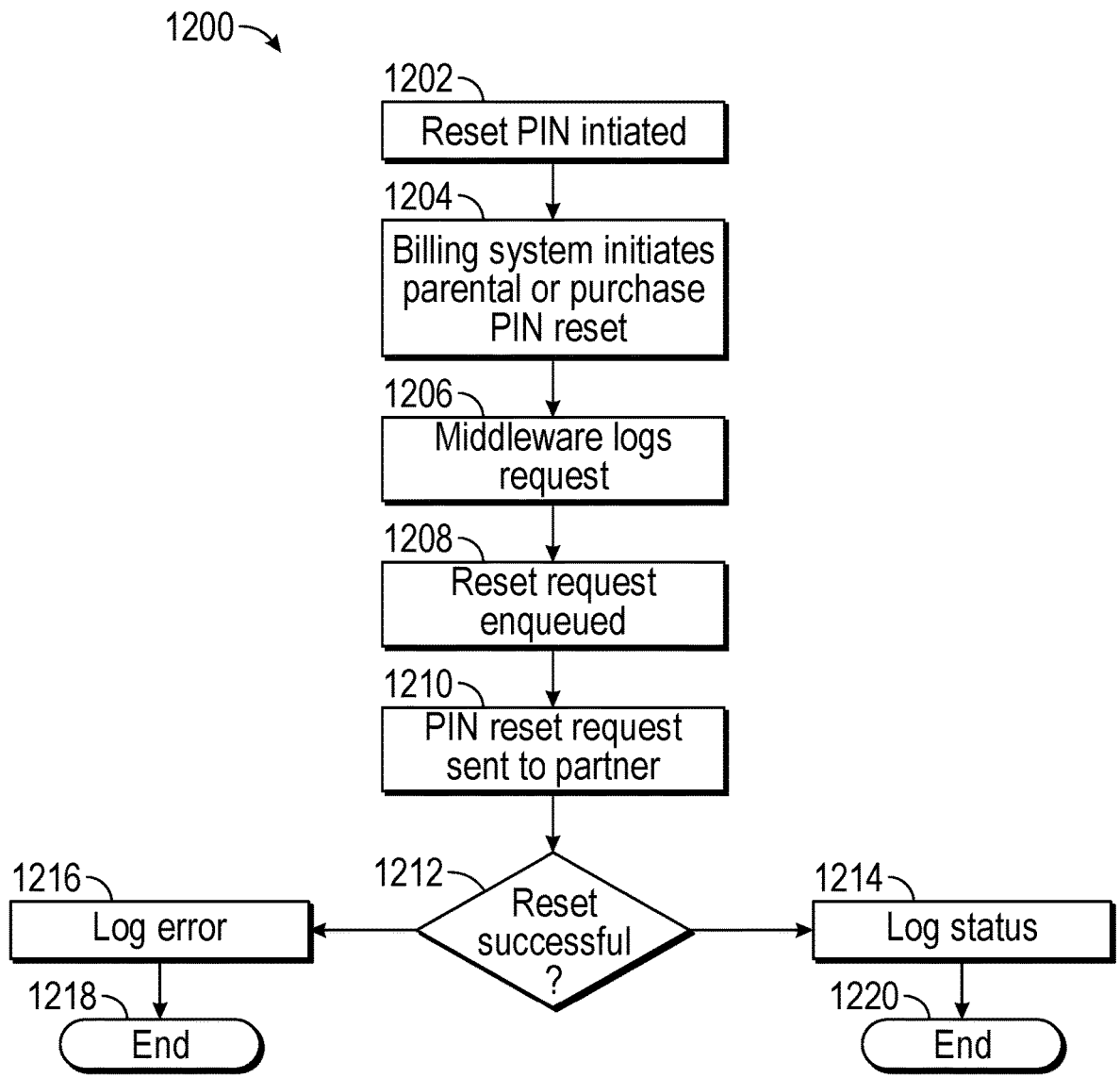
FIG. 12 shows an example flow diagram describing an example operation associated with a provisioning functionality of the integration system, in accordance with one or more example embodiments of the disclosure.

FIG. 12 shows an example flow diagram 1200, describing an example operation associated with a provisioning functionality of the integration system, in accordance with one or more example embodiments of the disclosure. At block 1202, a reset PIN can be initiated by the integration system. In one embodiment, the PIN can be initiated to perform a parental lock and/or to prevent the purchase of content by one or more users, for examples, users on an account on the home network.

Accordingly, at block 1204, the integration system can execute operations such that a billing system associated with the integration system on the home network can initiate a parental and/or a purchase PIN reset. In an embodiment, the integration system can send a data communication to the billing system, such that the billing system can initiate the parental and/or purchase PIN reset. Furthermore, the integration system can receive the request from the billing system accordingly.

At block 1206, the integration system can execute operations such that middleware running on the integration system can log such a request that is the request by the billing system to initiate a parental or purchase PIN reset, as shown at block 1204.

At block 1208, the integration system can execute operations to enqueue the reset request. In an embodiment, the enqueueing of the reset request by the integration system can serve to store the reset request for a time on which the integration system is not busy communicating with the third-party backend office computers. For example, if the integration system is busy receiving more critical data, the reset request can be enqueued for transmission at a future time to one or more computers associated with the third-party backend office network.

At block 1210, the integration system can execute operations to transmit the PIN reset request to the third-party partner network and/or computers associated with the third-party backend office and/or network.

At block 1212, the integration system can execute operations to determine whether the PIN reset was successful. That is, the reset was successful, for example, on the third-party partner network. In one embodiment, the integration system can make the determination of whether the PIN reset was successful or not based on information received back from the third-party network.

If, as a result of the operations executed at block 1212, it is determined by the integration system that the PIN reset was successful, then at block 1214 the integration system can log the status of the PIN reset.

Further, at block 1220, the operational flow describing an example provisioning functionality of the integration system can come to an end.

Alternatively, if at block 1212 the integration system determines that the PIN reset was not successful, for example based on information retrieved from the third-party partner network and/or one or more computer systems on the third-party back office network, then at block 1216 the integration system can log an error accordingly. Furthermore, the operational flow can then proceed to block 1218, where the provisioning functionality provided by the operations associated with the flow diagram 1200 can come to an end.

Figure 13:
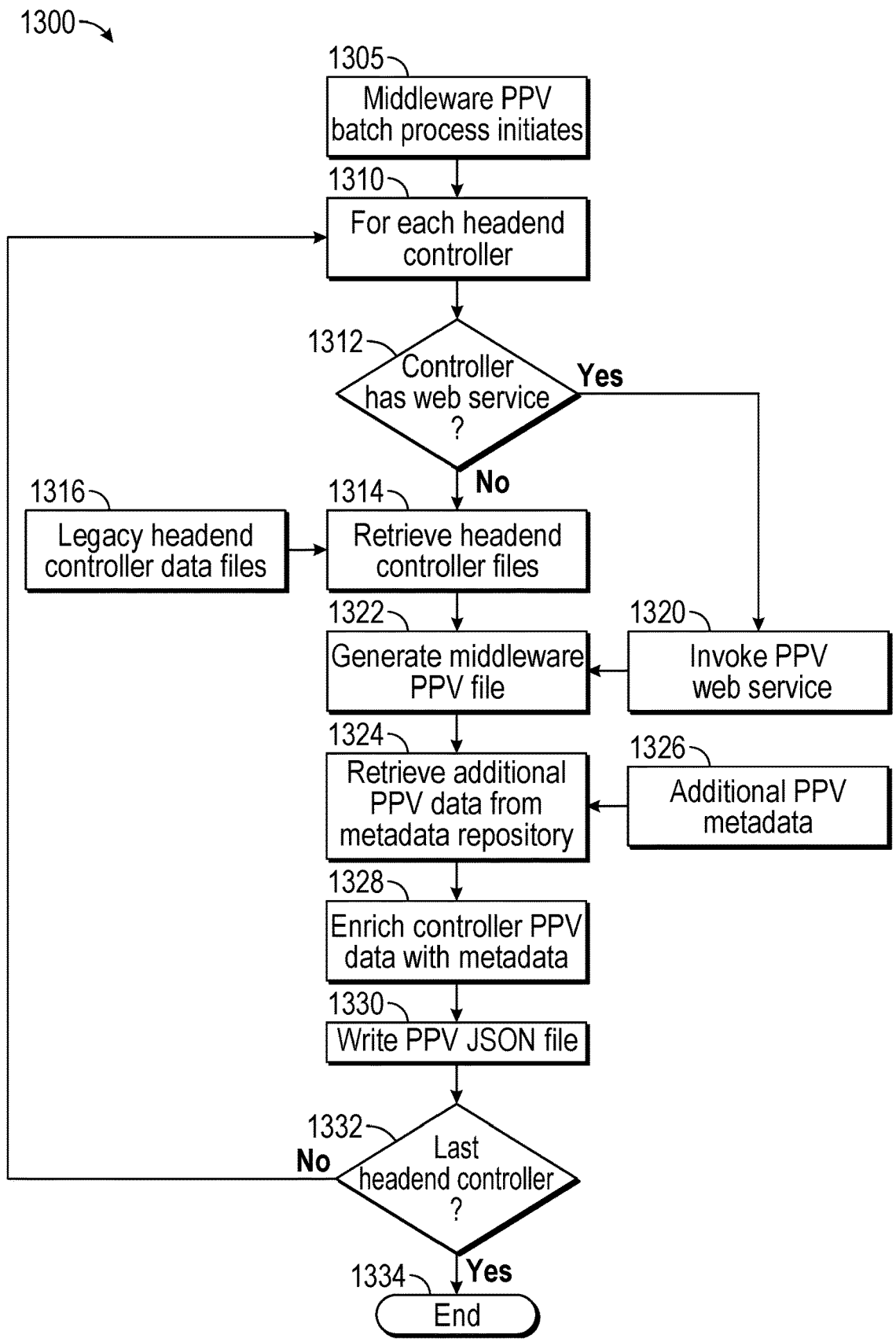
FIG. 13 shows an example flow diagram describing example operation associated with the metadata functionality of the integration system, in accordance with one or more example embodiments of the disclosure.

FIG. 13 shows an example flow diagram 1300, describing example operation associated with the metadata functionality of the integration system, in accordance with one or more example embodiments of the disclosure. In an embodiment, the operations associated with the flow of the diagram 1300 represent operations for cycling through legacy headend controllers, for example legacy headend controllers in a given market and/or region and determining a means of communication with the legacy headend controllers, for example, over a web service.

At block 1305, a middleware PPV batch process an initiate. In one embodiment, the middleware PPV batch process can include various operations for each headend controller to be performed periodically, for example, once every half an hour to once every hour or the like.

At block 1310, each headend controller can be identified such that the following operations can be conducted on each headend controller. At block 1312, the integration system can execute operations to determine whether the headend controller has a web service. In an embodiment, for example, the integration system can interrogate the headend controller with data and requests to determine whether the headend controller can operate using a web service or has a web service.

If at the result of the operations conducted at block 1312 to determine whether the headend controller has a web service, it is determined that the headend controller does not have a web service capability, then at block 1314 the integration system can execute operations to retrieve one or more headend controller files. For example, one or more legacy headend controller files (1316). If, on the other hand, the integration system determines that the controller has web service capability at block 1312, then the operational flow can continue to block 1320, where the integration system can invoke a PPV web service. In one embodiment, the PPV web service can be specific to PPV content.

Further, the operational flow from either scenarios represented at blocks 1314 and/or blocks 1320 can proceed to the operation shown at block 1322. In particular, at block 1322, the integration system can execute operations to generate a middleware PPV file. In one embodiment, the generation of the middleware PPV file can be produced based, at least in part, on either one or more legacy headend controller data files or a PPV web service, as previously described.

Further, the operational flow can continue to block 1324, where the integration system can execute operations to retrieve additional PPV data from a metadata repository. For example, the additional PPV data, as shown at block 1326, can be obtained from one or more storage devices associated with the integration system or a database associated with the integration system.

At block 1328, the integration system can enrich the controller PPV data with metadata. In one embodiment, the metadata can comprise or include data associated with the PPV content.

At block 1330, the integration system can write a PPV JavaScript Object Notation n (JSON) file based on the proceeding operations described above. In one embodiment the JSON file can indicate to the third-party back-end office network and/or computers what differences may exist between, for example, the headend controllers on the home network and the systems of the third-party network computers, set top boxes, and other such devices, including controllers.

At block 1332, the integration system can execute computer operations to determine whether the given headend controller under analysis is the last headend controller, for example, the last headend controller of a given region or market.

If it is determined at block 1332 that the headend controller under analysis is not the last headend controller, then the operational flow can resume at block 1310 (and associated operations ensuing therefrom). If, on the other hand, the integration system determines at block 1332 that the headend controller is indeed the last headend controller, for example, for a given region and/or market, then the operational flow can continue to block 1334, where the flow represented in diagram 1300 indicative of the metadata functionality can be brought to an end.

Figure 14:
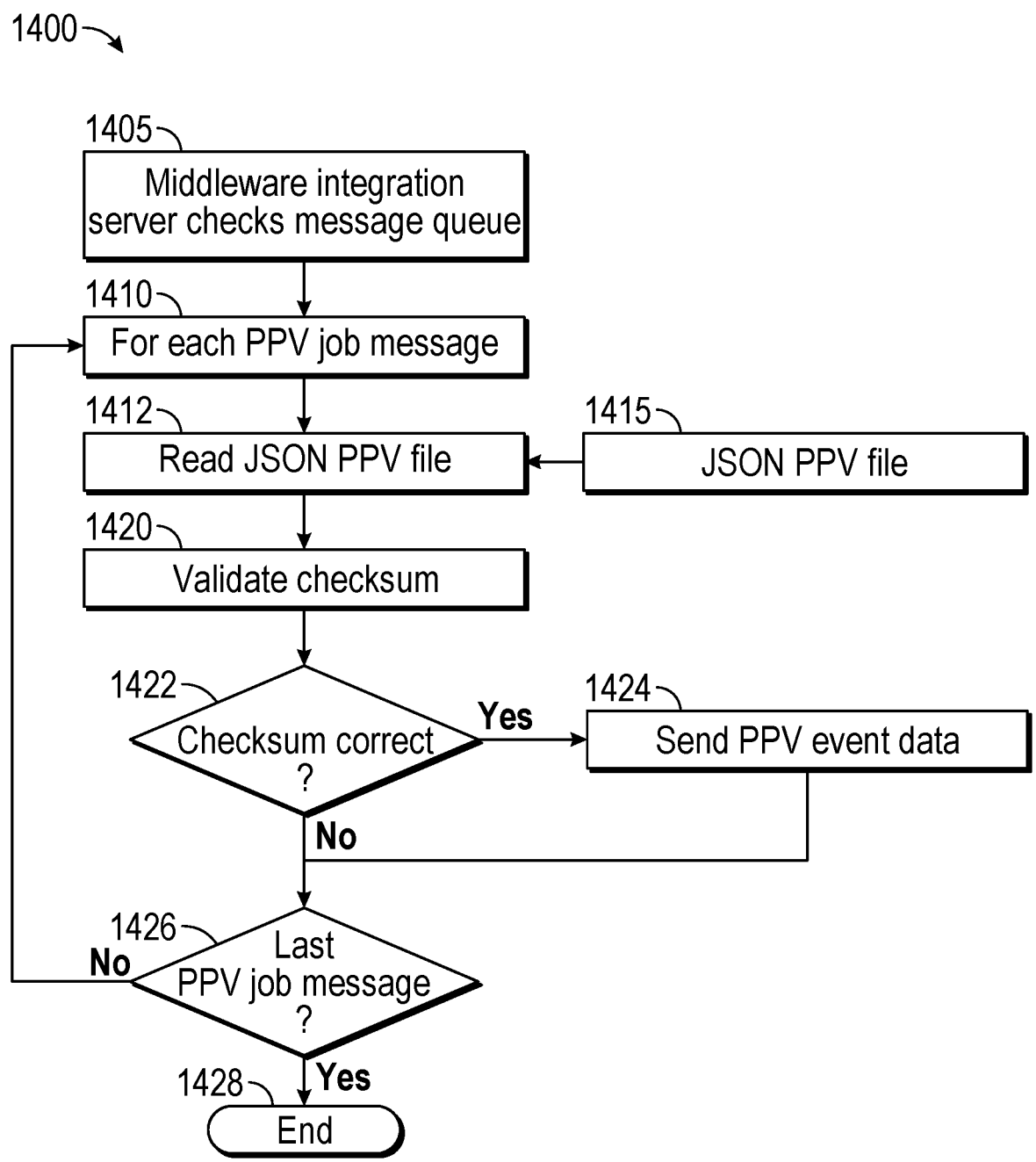
FIG. 14 shows an example flow diagram describing example operation associated with another metadata functionality of the integration system, in accordance with one or more example embodiments of the disclosure.

FIG. 14 shows an example flow diagram 1400, describing example operation associated with a metadata functionality of the integration system, in accordance with one or more example embodiments of the disclosure. In an embodiment, the operational flow 1400 describes one process for handling PPV legacy sessions. For example, the operational flow 1400, can serve to communicate file changes and/or format changes for PPV content between the home network, computers, and the third-party back office computers and/or servers.

At block 1405, a middleware integration system can check a message queue. In an embodiment, the message queue can include various messages indicative of a given PPV job. In an embodiment, each PPV job can be associated with a PPV content, for example, on the third-party network for presentation on a device associated with the home network.

At block 1410, the integration system can identify each PPV job message that is from the message queue identified in or checked at block 1405.

At block 1412, the integration system can execute operations to read the JSON PPV file associated with the PPV job message at block 1410. In particular, the integration system can obtain the JSON PPV file, as shown at block 1415, from one or more storage devices associated with the integration system.

At block 1420, the integration system can execute operations to validate a checksum on the JSON PPV file read at block 1412. In an embodiment, the checksum can be indicative of a change in the PPV format associated with the PPV file, for example, a change in a catalog for PPV content.

At block 1422, the integration system can execute one or more operations to determine whether the checksum validated at block 1420 is a correct checksum or an incorrect checksum. If it is determined at block 1422 that the checksum is correct, then at block 1424 the integration system can execute operations to send the PPV event data to, for example, a third-party network computer. If, on the other hand, the integration system at block 1422 determines that the checksum is not correct, then at block 1426 the integration system continues to the operational flow determined by block 1426.

Further, after sending the PPV event data file at block 1424, the operational flow can also continue to block 1426, where the integration system can execute operations to determine whether the PPV job message under consideration is indeed the last PPV job message, determined from, for example, the message queue.

If it is determined that the PPV job message is not the last PPV job message, then the operational flow reverts to the operations described at block 1410 and the ensuing operations therefrom. If, on the other hand, it is determined by the integration system at block 1426 that the PPV job message is indeed the last PPV job message, then the operational flow continues to block 1428, wherein the metadata functionality represented by the operational flow diagram 1400 is brought to an end.

Figure 15:
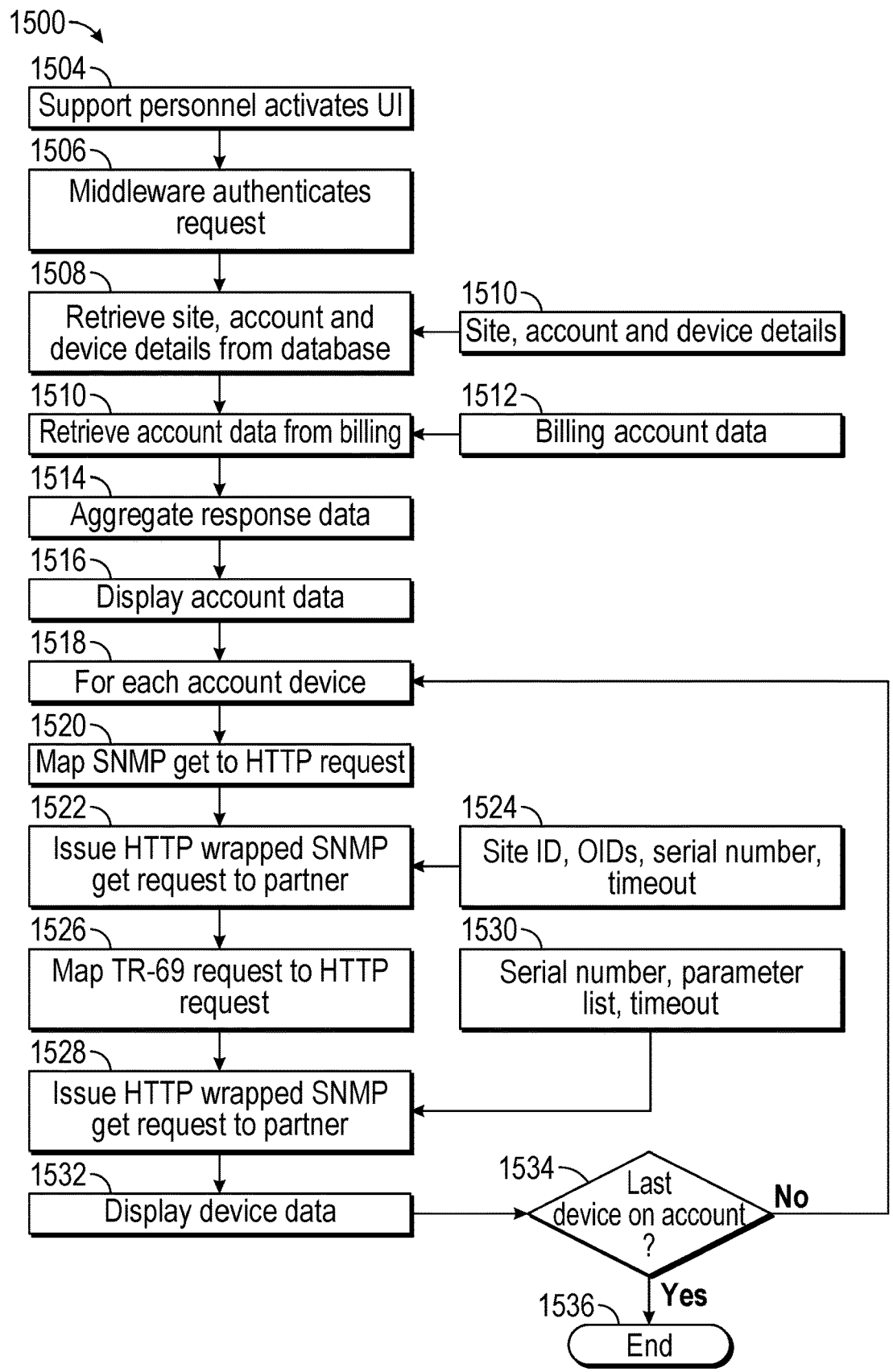
FIG. 15 shows an example flow diagram described in example operation associated with a service assurance functionality of the integration system, in accordance with one or more example embodiments of the disclosure.

FIG. 15 shows an example flow diagram 1500, described in example operation associated with a service assurance functionality of the integration system, in accordance with one or more example embodiments of the disclosure. In an embodiment, the operations described and shown in connection with diagram 1500 can provide a method for service assurance for customers utilizing devices and/or computers on a third-party network while being customers of a home network.

At block 1504, a support personnel can activate a user interface. In an embodiment, the support personnel can include an employee, for example, of the home network that is using a user interface associated with a third-party device or a user interface designed by the third-party network that may be running on a device associated with the home network. See, for example, FIG. 4 and associated description.

At block 1506, middleware can authenticate a request generated, for example, by the support personnel through the user interface at block 1504. For example, in an embodiment, the authentication of the request may include the entry of a password and/or a PIN by the support personnel into the user interface for authentication by the middleware.

At block 1508, the integration system can execute operations to retrieve site, account, and device details from a database. In an embodiment, the site, account, and device details (1510) can be determined from a database associated with the integration system and/or a storage device associated with the integration system.

At block 1510, the integration system can execute operations to retrieve account data from billing. In an embodiment, the billing account data (1512) can be determined from a billing system and/or device associated with the integration system.

At block 1514, the integration system can execute operation to aggregate response data. In an embodiment, the aggregation can include aggregating the site, account and/or device details gathered from the database as shown and described in connection with block 1508 and block 1510, with the billing account data retrieved at block 1510 and bock 1512.

In one embodiment, at block 1516, the integration system can execute operations to display account data. For example, in an embodiment, the integration system can display the account data at the user interface that is being used by the support personnel.

At block 1518, the integration system can execute operations to identify a given account device in order to run further operations to be described below in association with the account device. In one embodiment, the account device can include set tops, tablet, and/or other devices associated with the home network.

At block 1520, the integration system can execute operations to map an SNMP get to an HTTP request. In an embodiment, the operations executed at block 1520 can serve to map legacy devices using SNMP protocols to more contemporary devices using HTTP protocols.

At block 1522, the integration system can execute operations to issue HTTP wrapped SNMP get request and transmit this to a partner device. For example, a partner device associated with the third-party network. In one embodiment, the HTTP wrapped SNMP get request may need to be transmitted to the third-party network in order for one or more computers of the third-party network to be able to interpret the data originating from the legacy devices supported on the home network.

In another embodiment, as shown at block 1524, the operations of block 1522 may utilize one or more of a site ID an object ID (OID), a serial number, and/or a timeout associated with an account device on the home network.

At block 1526, the integration system can execute operations to map a TR-69 request to an HTTP request. Again, a TR-69 request may be associated with one or more legacy account devices on the home network, whereas the HTTP request can be associated with contemporary protocols and/or devices on both the home network and/or the third-party network. Accordingly, the operations described at block 1526 can serve to generate a mapping between the two protocols.

At block 1528, the integration system can execute operations to issue and/or transmit an HTTP wrapped SNMP get request based on the operations in the preceding 1526 block to a third-party partner network.

In one embodiment, as shown at block 1530, a serial number, a parameter list, and/or a timeout parameter associated with an account device can be used in order to generate and/or transmit or issue the HTTP wrapped SNMP get request, as described in connection with block 1528.

At block 1532, the integration system can execute operations to display device data indicative of one or more of the previous operations 1520, 1522, 1526, and/or 1528. In an embodiment, the operation of block 1532 displaying device data can be performed on a user interface for presentation to a support personnel.

At block 1534, the integration system can execute operations to determine whether the account device under analysis is the last device on a given account associated with the service session initiated by the support personnel.

If, as a result of the executed operations at block 1534, it is determined that there are more devices on the account then the operational flow reverts to block 1518, where another account device is identified for performing the operations ensuing from block 1518.

On the other hand, if at block 1534 the integration system determines that the device under analysis is the last device associated with the account, then the operational flow proceeds from block 1534 to block 1536, where the operational flow is brought to an end.

Figure 16:
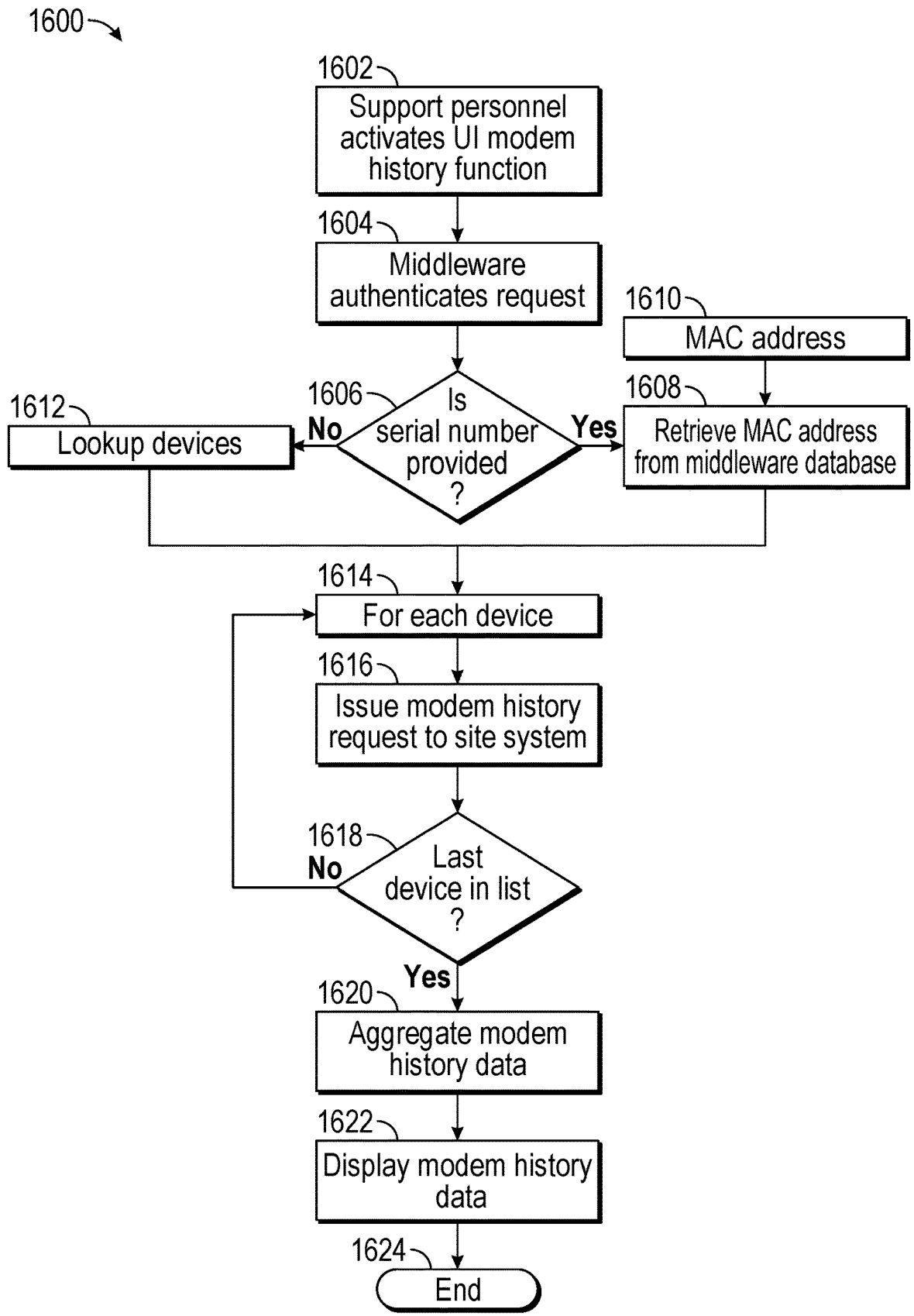
FIG. 16 shows an example flow diagram describing an example operation associated with another service assurance functionality of the integration system, in accordance with one or more example embodiments of the disclosure.

FIG. 16 shows an example flow diagram 1600, describing an example operation associated with the service assurance functionality of the integration system, in accordance with one or more example embodiments of the disclosure. In an embodiment, the operational flow 1600 can also serve to allow support personnel to monitor various issues in the integration between the home network and the third-party network as they may arise.

At block 1602, support personnel can activate a user interface modem history function. In one embodiment, the support personnel can include employees of the home network. In another embodiment, the user interface can be a third-party user interface that can be running on a device associated with the home network, for example, a modem device and/or a set top device running on the home network.

In another embodiment, the history function described at block 1602 can track the historical performance associated with the given device on the home network under analysis.

At block 1604, a middleware can authenticate the request resulting from the operations described at block 1602. In one embodiment, the authentication of the request can include an operation to obtain a password by the support personnel, for example, at the user interface on a given device for authentication.

At block 1606, the integration system can execute operations to determine whether a serial number is provided as a part of the request generated by the support personnel, for example, through the user interface.

If it is determined, as a result of the operations executed at block 1606 that a serial number is not provided, then at block 1612 the integration system can perform one or more operations to look up the devices by, for example, other identifying information. For example, an IP address, a region location, a geographic location, and/or another form of identification.

If, on the other hand, the operations executed at block 1606 indicate that a serial number is provided, then at block 1608 the integration system can execute operations to further retrieve a Media Access Control (MAC) address from a middleware database associated with the integration system. In an embodiment, the MAC address (1610) can be stored at the middleware database, for example, on one or more storage devices associated with the integration system.

The flow can proceed from either block 1606 or block 1612, as the case may be, to block 1614, where the integration system can identify a given device for further operations to be performed thereon.

At block 1616, the integration system can execute operations to issue a modem history request to a site system. In an embodiment, the site system can be a part of either the home network or the third-party network. In one embodiment, the modem history request can include a request to receive historical information associated with the performance of the device under analysis at block 1614.

At block 1618, the integration system can execute operations to determine whether the device under analysis is the last device in a list of devices stored in the integration system for analysis. If it is determined that there are additional devices, then the operational flow can continue from block 1618 back to block 1614 for the next device to analyze.

If, on the other hand, the operations executed at blocks 1618 by the integration system determine that the device under analysis is the last device in a list referenced by the integration system, then the operational flow can continue to block 1620, at which the integration system can aggregate modem history data.

In one embodiment, the aggregation of modem history data by the integration system at block 1620 can include an aggregation of data associated with one or more subsystems of the device and/or other peripheral devices associated with a given device.

At block 1622, the integration system can display the modem history data determined from the preceding steps. For example, the integration system can display the modem history data at a user interface for presentation to the support personnel. In another embodiment, the user interface can be a user interface generated at least in part by a third-party computer running on a third-party network. At this point, the operational flow can continue to block 1624, where the operational diagram for the functionality of service assurance functionality represented by the diagram 1600 can come to an end.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example, a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example, magnetic, magneto-optical disks, or optical disks. However, a computer need not have such devices. Devices suitable for storing computer program instructions and information/data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example, a CRT (cathode ray tube) or LCD (liquid crystal display) monitor, for displaying information/data to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example, as an information/data server, or that includes a middleware component, for example, an application server, or that includes a front-end component, for example, a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example, an HTML page) to a client device (for example, for purposes of displaying information/data to and receiving user input from a user interacting with the client device). Information/data generated at the client device (for example, a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving, by an integration system, a first account number and a second account number;
   determining, based on a comparison between the first account number and a set of stored account numbers, that the first account number is a valid account number;
   determining, based on a comparison between the second account number and the set of stored account numbers, that the second account number is an invalid account number;
   retrieving, based on the determination that the first account number is a valid account number, information about a device associated with the first account number, wherein the device is a device on a home network of a consumer, wherein the device includes legacy software or firmware; and
   providing data to the device associated with the first account number that facilitates provisioning of content to the device associated with the first account number, the data including at least one of: third party software or third party firmware associated with a third-party network.

2. The method of claim 1, wherein the receiving the first account number comprises receiving the first account number from the third-party network, the receiving performed over the Internet.

3. The method of claim 1, further comprising performing one or more synchronization operations comprising determining a channel mapping between the home network and the third-party network.

4. The method of claim 1, wherein receiving the first account number comprises receiving data from a billing system on the home network.

5. The method of claim 1, further comprising retrieving, from the third-party network over the Internet, a third-party account number that is associated with the first account number.

6. The method of claim 5, further comprising determining that the first account number requires synchronization based on a type of an account associated with the first account number.

7. The method of claim 5, further comprising performing one or more synchronization operations wherein the synchronization operations are based at least in part on the third-party account number.

8. The method of claim 1, wherein the providing data to the device comprises receiving data from a second device associated with the third-party network.

9. The method of claim 1, further comprising determining, one or more rules indicative of account permissions associated with the account.

10. The method of claim 9, wherein providing data to the device is further based at least in part on the one or more rules.

11. A system comprising:
    at least one memory that stores computer-executable instructions; and
    at least one processor of the one or more processors configured to access the at least one memory, wherein the at least one processor of the one or more processors is configured to execute the computer-executable instructions to:
    receive a first account number and a second account number;
    determine, based on a comparison between the first account number and a set of stored account numbers, that the first account number is a valid account number;
    determine, based on a comparison between the second account number and the set of stored account numbers, that the second account number is an invalid account number;
    retrieve, based on the determination that the first account number is a valid account number, information about a device associated with the first account number, wherein the device is a device on a home network of a consumer, wherein the device includes legacy software or firmware; and
    provide data to the device associated with the first account number that facilitates provisioning of content to the device associated with the first account number, wherein the data includes at least one of: third party software or third party firmware associated with a third-party network.

12. The system of claim 11, wherein causing to receive, by the at least one processor, the first account number comprises causing to receive, by the at least one processor, the first account number from one or more second devices associated with the third-party network, wherein further the receiving is performed over the Internet.

13. The system of claim 11, further comprising perform, by the at least one processor, one or more synchronization operations comprising determining a channel mapping between the home network and the third-party network.

14. The system of claim 11, wherein receiving, by the at least one processor, the account number comprises causing to receive, by the at least one processor, data from a billing system on the home network.

15. The system of claim 11, wherein the at least one processor is further configured to execute the computer-executable instructions to retrieve, by the at least one processor, from the third-party network over the Internet, a third-party account number that is associated with the first account number.

16. The system of claim 15, wherein the at least one processor is further configured to execute the computer-executable instructions to determine that the first account number requires synchronization based on a type of an account associated with the first account number.

17. The system of claim 15, wherein the at least one processor is further configured to execute the computer-executable instructions to perform one or more synchronization operations, wherein the synchronization is based at least in part on the third-party account number.

18. The system of claim 11, wherein causing to provide data, by the at least one processor, to the device further comprises causing to receive, by the at least one processor, data from a second device associated with the third-party network, wherein further.

19. The system of claim 11, wherein the at least one processor is further configured to execute the computer-executable instructions to determine, by the at least one processor, one or more rules indicative of account permissions associated with the account.

20. The system of claim 19, wherein causing to provide, by the at least one processor, data to the device is further based at least in part on the one or more rules.

* * * * *